US010015566B2

(12) United States Patent
Feng

(10) Patent No.: US 10,015,566 B2
(45) Date of Patent: Jul. 3, 2018

(54) LIVE VIDEO PROCESSING METHOD AND ASSOCIATED DEVICES AND COMMUNICATION SYSTEM

(71) Applicant: Tencent Technology (Shenzhen) Company Limited, Shenzhen (CN)

(72) Inventor: Feng Feng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/152,366

(22) Filed: May 11, 2016

(65) Prior Publication Data

US 2016/0255419 A1 Sep. 1, 2016

Related U.S. Application Data

(63) Continuation of application No. PCT/CN2014/090872, filed on Nov. 12, 2014.

(30) Foreign Application Priority Data

Nov. 14, 2013 (CN) .......................... 2013 1 0568159

(51) Int. Cl.
*H04N 5/76* (2006.01)
*H04N 21/8547* (2011.01)
(Continued)

(52) U.S. Cl.
CPC ......... *H04N 21/8547* (2013.01); *H04L 67/02* (2013.01); *H04N 21/2187* (2013.01);
(Continued)

(58) Field of Classification Search
CPC combination set(s) only.
See application file for complete search history.

(56) References Cited

U.S. PATENT DOCUMENTS

| 2012/0158432 A1* | 6/2012 | Jain ........................ G06Q 10/10 |
| | | 705/3 |
| 2014/0089424 A1* | 3/2014 | Oztaskent ............... H04L 51/08 |
| | | 709/206 |
| 2015/0310126 A1* | 10/2015 | Steiner ................ G06F 17/2247 |
| | | 715/204 |

FOREIGN PATENT DOCUMENTS

| CN | 101079994 A | 11/2007 |
| CN | 102307156 A | 1/2012 |

(Continued)

OTHER PUBLICATIONS

Tencent Technology, ISRWO, PCTCN2014090872, Mar. 4, 2015, 10 pgs.
Tencent Technology, IPRP, PCTCN201409872, May 17, 2016, 6 pgs.

*Primary Examiner* — Kieu Oanh T Bui
(74) *Attorney, Agent, or Firm* — Morgan, Lewis & Bockius LLP

(57) ABSTRACT

Embodiments of the present application disclose a video processing method, associated devices and a communication system. The video processing method may comprise: obtaining, by a screenshot server, a video from a video server; capturing, by the screenshot server, a plurality of pictures from the video based on a preset screenshot strategy; and storing, by the screenshot server, the pictures into a storage server such that a first user terminal obtains the pictures from the storage server and plays the pictures. Technical solutions of the embodiments of the present application are favorable to reduce a lag phenomenon as much as possible.

17 Claims, 8 Drawing Sheets

(51) Int. Cl.
*H04N 21/254* (2011.01)
*H04N 21/2747* (2011.01)
*H04L 29/08* (2006.01)
*H04N 21/2187* (2011.01)
*H04N 21/231* (2011.01)
*H04N 21/262* (2011.01)
*H04N 21/2343* (2011.01)
*H04N 21/2743* (2011.01)

(52) U.S. Cl.
CPC .............. *H04N 21/23106* (2013.01); *H04N 21/234336* (2013.01); *H04N 21/254* (2013.01); *H04N 21/26258* (2013.01); *H04N 21/2743* (2013.01); *H04N 21/2747* (2013.01)

(56) References Cited

FOREIGN PATENT DOCUMENTS

| | | |
|---|---|---|
| CN | 103020076 A | 4/2013 |
| CN | 103546766 A | 1/2014 |

* cited by examiner

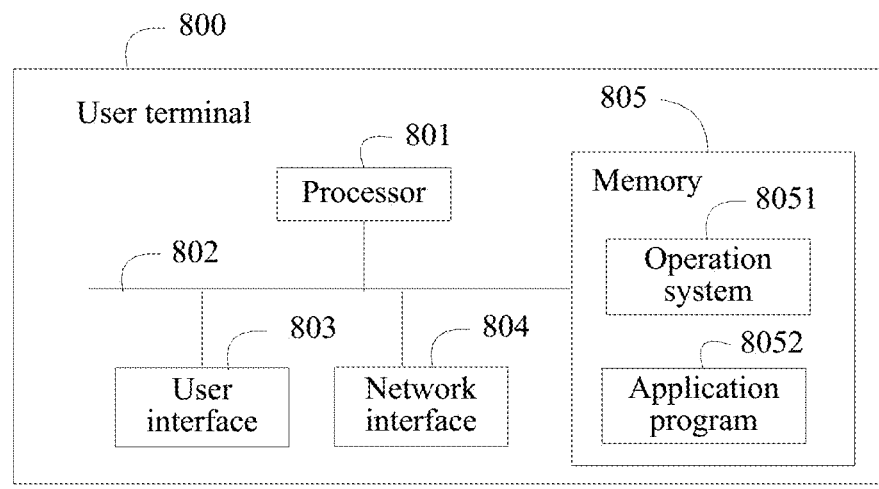
FIG. 8
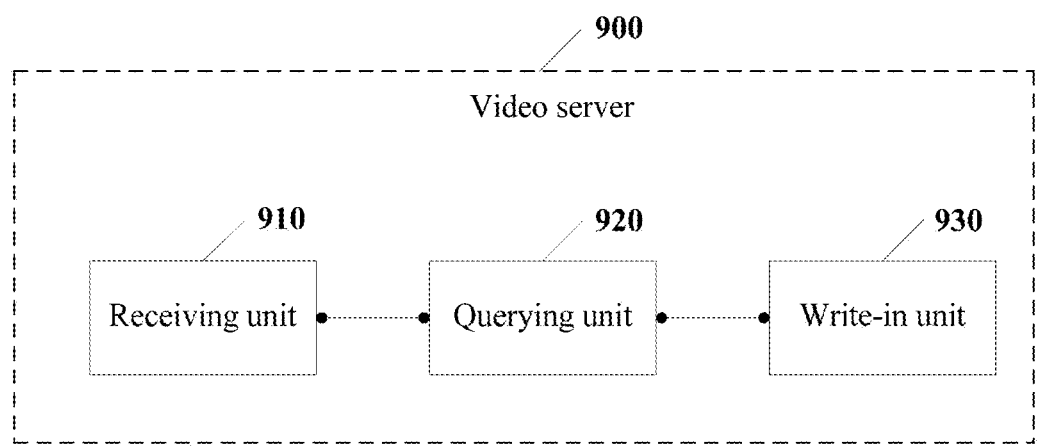
FIG. 9-a

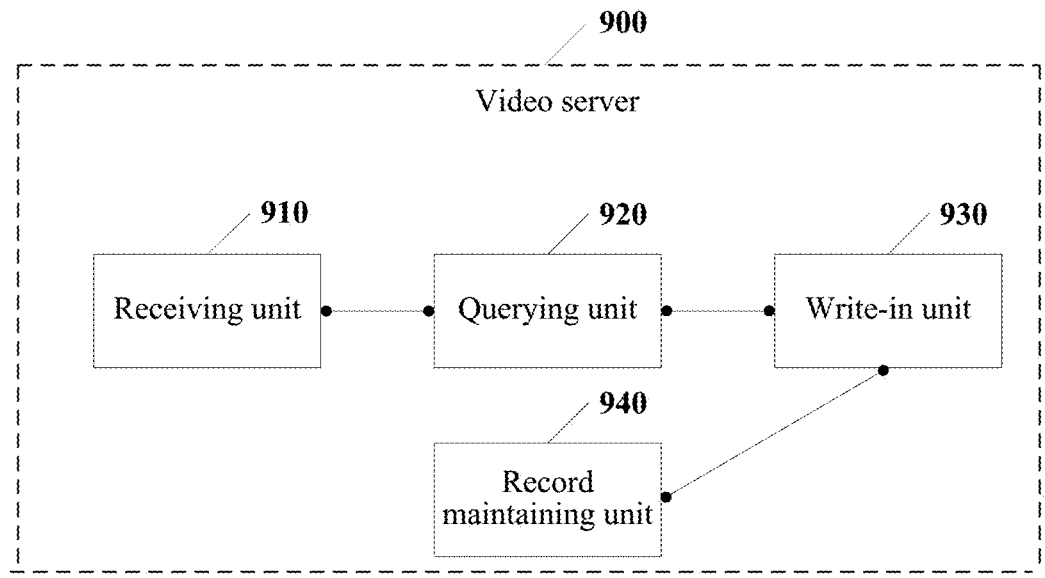
FIG. 9-b
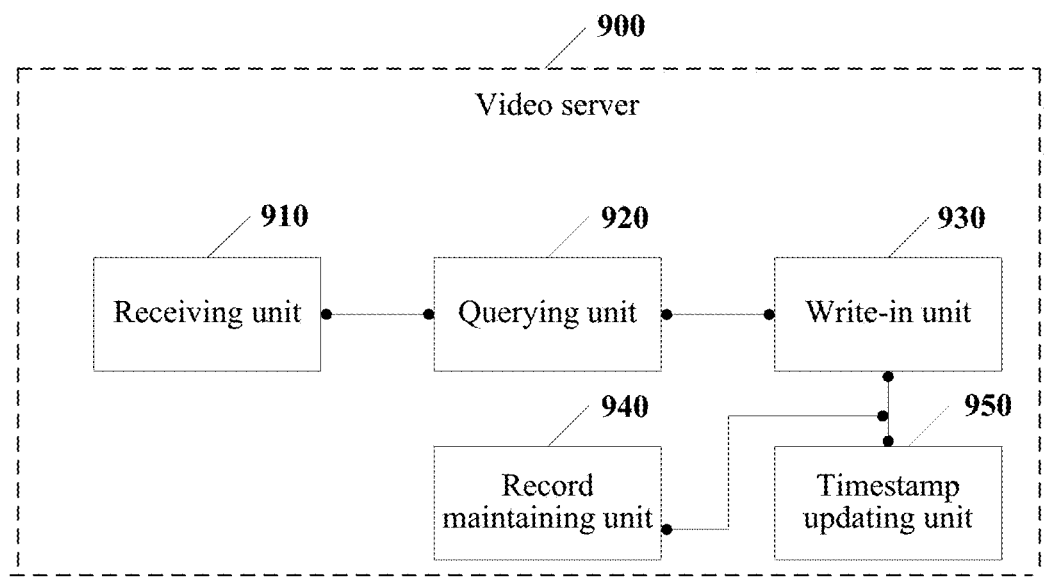
FIG. 9-c

LIVE VIDEO PROCESSING METHOD AND ASSOCIATED DEVICES AND COMMUNICATION SYSTEM

RELATED APPLICATIONS

This application is a continuation application of PCT Patent Application No. PCT/CN2014/090872, entitled "VIDEO PROCESSING METHOD AND ASSOCIATED DEVICES AND COMMUNICATION SYSTEM" filed on Nov. 12, 2014, which claims priority to Chinese Patent Application No. 201310568159.9, entitled "VIDEO PROCESSING METHOD AND ASSOCIATED DEVICES AND COMMUNICATION SYSTEM" filed on Nov. 14, 2013, both of which are incorporated by reference in their entirety.

FIELD OF THE TECHNOLOGY

The present disclosure relates to the technical field of computers, in particular to a video processing method and associated devices and a communication system.

BACKGROUND OF THE DISCLOSURE

At present, there are many video service tools such as Tencent Video and Sohu Video, a video channel is a storage source for storing video data in a video server, and information such as a timestamp and a user identifier of a user belonging to the video channel may be recorded in the video channel.

For a network live broadcasting scene, a video source user terminal may show some real time live broadcasting pictures to other users on the network, such as game live broadcasting, reality show and the like. These live broadcasting content may be shown in application software and on an official website, thus, these feature content may be propagated in a manner of being closer to the user. In an existing technology, when a live broadcasting video is shown by a website, an address of the live broadcasting video is generally embedded into a webpage, and a user terminal checks the live broadcasting video by a video player.

In a research and practice process, the inventor of the present disclosure found that the existing technology at least has following technical problems: since the existing technology directly embeds the address of the video into the webpage when a video (live broadcasting) is shown by the website, the user obtains the address of the video after downloading the webpage, then the video is checked by using the video address through the video player, and a terminal device with slower network speed and/or poor hardware configuration often has a lag phenomenon.

SUMMARY

Embodiments of the present application provide a video processing method and associated devices and a communication system, so as to avoid a lag phenomenon as much as possible.

A first aspect of the embodiments of the present application provides a video processing method, which may include:
obtaining, by a screenshot server, a video from a video server;
capturing, by the screenshot server, a plurality of pictures from the video based on a preset screenshot strategy; and
storing, by the screenshot server, the pictures into a storage server such that a first user terminal obtains the pictures from the storage server and plays the pictures on the first user terminal.

A second aspect of the embodiments of the present application provides a video processing method performed by a first user terminal, which may comprise:
obtaining, by the first user terminal, a webpage source code from a site server;
obtaining, by the first user terminal, a plurality of pictures from a storage server based on an embedded picture access address in the webpage source code, the pictures being captured by the screenshot server from a video from a video server based on a preset screenshot strategy, each picture having associated playing order information; and
broadcasting, by the first user terminal, the pictures according to their associated playing order information.

A third aspect of the embodiments of the present application provides a screenshot server, which may comprise:
a video obtaining unit, configured to obtain a video from a video server;
a capturing unit, configured to capture a plurality of pictures from the video based on a preset screenshot strategy; and
a storage unit, configured to store the pictures into the storage server such that a first user terminal obtains the pictures from the storage server and plays the pictures on the first user terminal.

A fourth aspect of the present application provides a user terminal, which may comprise:
a first obtaining unit, configured to obtain a webpage source code from a sire server;
a second obtaining unit, configured to obtain a plurality of pictures from a storage server based on an embedded picture access address in the webpage source code, the pictures being captured by the screenshot server from a video from a video server based on a preset screenshot strategy, each picture having associated playing order information; and
a playing unit, configured to broadcast the pictures according to their associated playing order information.

Known from above, technical solutions of some embodiments of the present application introduce a screenshot server, which obtains a video from a video server, captures a plurality of pictures from the video based on a present screenshot strategy and stores the pictures into the storage server such that a first user terminal obtains the pictures from the storage server to play. Since the screenshot server obtains the video from the video server, captures a plurality of pictures from the video and stores into the storage server, so that the user terminal may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

BRIEF DESCRIPTION OF THE DRAWINGS

To describe the technical solutions of the embodiments of the present application or the existing technology more clearly, the following briefly introduces the accompanying drawings required for describing the embodiments or the existing technology. Apparently, the accompanying drawings in the following description show only some embodiments of the present application, and a person of ordinary skill in the art may still derive other drawings from these accompanying drawings without creative efforts.

FIG. 8 is a schematic diagram of another user terminal according to an embodiment of the present application;

FIG. 9-a is a schematic diagram of a video server according to an embodiment of the present application;

FIG. 9-b is a schematic diagram of another video server according to an embodiment of the present application;

FIG. 9-c is a schematic diagram of another video server according to an embodiment of the present application;

DESCRIPTION OF EMBODIMENTS

Embodiments of the present application provide a video processing method, associated devices and a communication system so as to avoid a lag phenomenon.

In order to enable the skilled in the art to better understand solutions of the present application, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art may obtain other embodiment(s), without any inventive work, which should be within the scope of the disclosure.

Detailed description is performed respectively as follows:

The terms "first", "second", "third" and "fourth" etc., (if exist) in the description, claims and drawings of the present disclosure intend to distinguish similar objects instead of describing a specific sequence or a precedence sequence. It should be understood that data used as such mode may be interchanged in proper cases, such that the embodiments of the present application described herein may be implemented in other sequences besides those sequences illustrated or described herein. In addition, the terms "include", "comprise", and any variants thereof are intended to cover a non-exclusive inclusion. For example, a process, method, system, product or device that includes a series of steps or units is not limited to include those steps or units specified expressly, and may include other inherent steps or units elements, not specified expressly, of the process, method, product, or device.

According to one embodiment of a video processing method of the present disclosure, the method may comprise: obtaining, by a screenshot server, a video from a video server; capturing, by the screenshot server, a plurality of pictures from the video based on a preset screenshot strategy; and storing, by the screenshot server, the pictures into a storage server such that a first user terminal obtains the pictures from the storage server to play.

Figure 1:
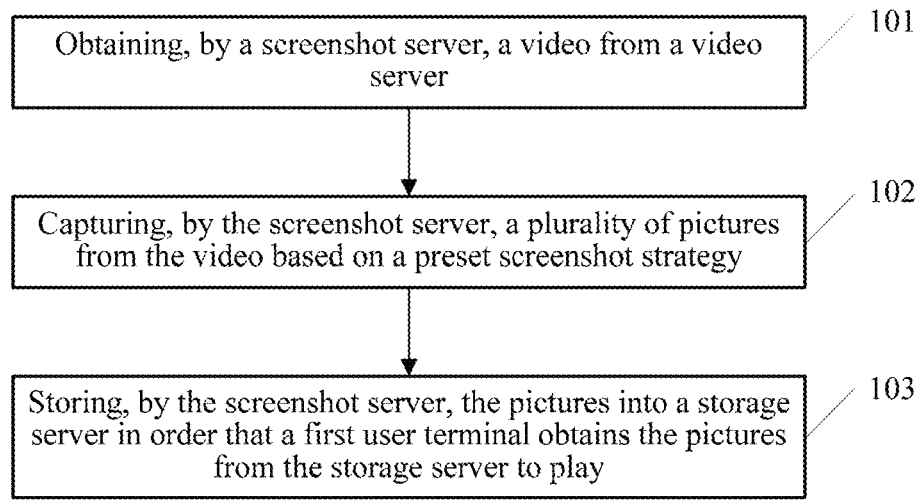
FIG. 1 is a flow schematic diagram of a video processing method according to an embodiment of the present application.

Firstly referring to FIG. 1 which is a flow schematic diagram of a video processing method according to an embodiment of the present application. As shown in FIG. 1, a video processing method provided in one embodiment of the present application may comprise:

101: Obtaining, by a screenshot server, a video from a video server.

For example, when a certain user terminal (called as a second user terminal for the purpose of quote) establishes connection with a video server, the second user terminal may upload a video (for example a live broadcasting video) to the video server, which receives the video uploaded by the second user terminal, wherein the second user terminal transmitting the video belongs to a certain user (called as a second user).

The screenshot server may, for example, obtain the live broadcasting video or other types of video uploaded by the second user terminal.

The user terminal denoted in each embodiment of the present application may be a personal computer, a cellphone, a personal digital processing device, or other types of user terminals.

In some embodiments of the present application, after receiving the video from the second user terminal, the video server, based on multiple hash algorithms, queries whether a record used for identifying a mapping relation between the second user and a video channel is stored in a mapping record storage region thereof.

In some embodiments of the present application, before receiving a first video from the second user terminal, the video sever has allocated the video channel to the second user or not (the video server may never allocate the video channel to the second user before, or reallocates the video channel allocated to the second user before to other users, or resets the video channel allocated to the second user before to an idle video channel, wherein the idle video channel does not belong to any user). The video channel is a storage resource (for example a memory resource) used for storing the video in the video server, and a timestamp (the timestamp is used for recording the latest use time of the video channel) may be recorded in the video channel and information such as a user identifier of the user belonging to the video channel may also be recorded in the video channel.

If querying that no record used for identifying a mapping relation between the second user and the video channel is stored in above mapping record storage region, the video server allocates a first video channel in an idle state at current to the second user, and writes the first video into the first video channel.

If the video sever queries that no record used for identifying a mapping relation between the second user and the video channel is stored in above mapping record storage region, it is indicated that the video server possibly allocates no video channel to the second user at current.

In some embodiments of the present application, the allocating a first video channel in an idle state at current to the second user may include: allocating a first video channel in an idle state at current to the second user based on an idle chain table, wherein video channel identifiers corresponding to a plurality of video channels including the first video channel in an idle state at current are stored in the idle chain table, and the video channel identifier of the first video channel is recorded at a head or tail or any position in the idle chain table.

In some embodiments of the present application, the video server may further identify that the first video channel belongs to the second user in the first video channel (for example, may writes the user identifier of the second user into the first video channel).

In some embodiments of the present application, the video server may further generate a first record used for identifying a mapping relation between the second user and the video channel, calculates to obtain a first storage address based on the multiple hash algorithms, and writes the first record into a first storage space directed by the first storage address, wherein the first storage space belongs to above mapping record storage region.

In some embodiments of the present application, when writing the first video into the first video channel, the video server may further update a timestamp of the first video channel, it is understandable that time indicated by the timestamp of the first video channel updated by the video server may be the time of writing the first video into the first video channel.

In some embodiments of the present application, input of above multiple hash algorithms is for example a user code of the second user (wherein the user code is a plurality of numbers), and the user code of the second user is the user identifier of the second user or obtained by converting the user identifier of the second user.

In some embodiments of the present application, $K \geq N*M*P$, wherein K is the size of the total storage space of the mapping record storage region, M is a total number of the video channels capable of being provided by the video server, and P is the size of the storage space occupied storing one record used for identifying a mapping relation between the second user and the video channel, N is a positive integer, and for example, N may be 1, 2, 3, 4, 5, 6 or other values.

For instance, P is equal to 10 bytes, M is equal to 100, and N is equal to 6, then K may be larger than or equal to 6000 bytes. Since an addressing space of the mapping record region is larger than or equal to a storage space occupied by all video channels capable of being provided by the video server, it is favorable to allocate the video channels capable of being provided by the video server as fully as possible, and to improve a use rate of the video channels.

For example, the mapping record storage region may comprise at least N mapping record sub-storage regions, a storage space of each mapping record sub-storage region is larger than or equal to M*P, wherein M is a total number of the video channels capable of being provided by the video server, and P is the size of the storage space occupied storing one record used for identifying a mapping relation between the second user and the video channel. In such a scene, each hash algorithm in the multiple hash algorithms corresponds to a different mapping record sub-record region, a denominator of each hash algorithm is different and may be a prime number smaller than M.

In some embodiments of the present application, the method further comprises: if querying that a second record used for indicating a mapping relation between the second user and a second video channel exists in the mapping record storage region, the video server writes the first video into the second video channel. In addition, the video server may further identify that the second video channel belongs to the second user in the second video channel (for example, may writes the user identifier of the second user into the second video channel).

If the video sever queries that the second record used for identifying a mapping relation between the second user and the second video channel is stored in above mapping record storage region, it is indicated that the video server has allocated the second video channel to the second user before.

In some embodiments of the present application, when meeting set channel reset conditions, the video server may further reset part or all currently overtime video channels to be idle video channels. In some embodiments of the present application, the overtime video channels refer to that lag of time indicated by the timestamp corresponding to such video channel relative to current time exceeds a first duration threshold value, wherein the duration threshold value may be, for example, one second, two seconds, three seconds, or other durations set according to actual demands. The overtime video channels belong to a certain user. For example, when it is detected that the first video channel or the second video channel is overtime, the video sever resets the first video channel or the second video channel to be the idle video channel and may record the video channel identifier of the first video channel or the second video channel reset to be idle on a head or tail or any position in above idle chain table. Further, if resetting the first video channel or the second video channel to the idle video channels, the video server may further delete a record used for identifying a mapping relation between the second user and the second video channel stored in above mapping record storage region.

In some embodiments of the present application, the channel reset conditions may be various feasible conditions set according to actual scene demands. For example, the channel reset conditions may comprise at least one of following conditions: the quantity of the currently idle video channels is less than a set first threshold value (for example 10 or other values), a ratio of the quantity of the currently idle video channels to the total channel quantity is less than a set second threshold value (for example 15% or other values), an overtime video channel reset command is received, the quantity of the currently idle video channels is larger than a set third threshold value (for example 20 or other values), a set reset period (for example, one minute, two minutes or other values) is up, a ratio of the quantity of the currently idle video channels to the total channel quantity is larger than a set fourth threshold value (for example 50% or other values), and a ratio of the quantity of the currently idle video channels to the quantity of the currently idle video channels is larger than a set fifth threshold value (for example 1 or other values).

Values of respective threshold values (for example, the first threshold value, second threshold value, third threshold value, fourth threshold value and fifth threshold value) of the embodiments of the present application may be set according to specific scene demands as long as meeting actual demands.

It can be seen that the video server may specifically develop the mapping record storage region to store the record used for identifying a mapping relation between the user and the video channel, and queries whether a record used for identifying a mapping relation between the second user and the video channel is stored in the mapping record storage region based on multiple hash algorithms, indexing efficiency of the user video channel is greatly improved due to such a technology indexing the video channels of the user.

Of course, the video server may cache the video uploaded by the second user in other manners.

102: Capturing, by the screenshot server, a plurality of pictures from the video based on a preset screenshot strategy.

In some embodiments of the present application, the preset screenshot strategy may be to capture a plurality of pictures from the video according to a certain capturing frequency, or capture a plurality of pictures from the video according to multiple set capturing time points, and of course the preset screenshot strategy can be specifically set according to actual scene demands.

103, Storing, by the screenshot server, the pictures into a storage server such that a first user terminal obtains the pictures from the storage server and plays the pictures on the first user terminal (the first user terminal may for example broadcast the obtained pictures to form a dynamic effect).

In some embodiments of the present application, the screenshot server may generate a timestamp corresponding to each picture in the pictures as the corresponding playing order information and store the timestamp corresponding to each picture into the storage server such that after the first user terminal obtains the pictures and the timestamp corresponding to each picture in the pictures from the storage server, the first user terminal plays the pictures based on a time sequence indicated by the timestamp corresponding to each picture, wherein the timestamp corresponds to each picture being used for indicating a time position of the picture in the video.

In some embodiments of the present application, the operation of playing the pictures based on a time sequence indicated by the timestamp corresponding to each picture includes: broadcasting the pictures based on a time sequence indicated by the timestamp corresponding to each picture. It is understandable that the first user terminal broadcasts the pictures based on a time sequence indicated by the timestamp corresponding to each picture, thus being favorable to show a video recovery effect to certain degree.

In some embodiments of the present application, the screenshot server may generate a playing serial number corresponding to each picture in the pictures as the corresponding playing order information, and stores the playing serial number corresponding to each picture into the storage server such that, after the first user terminal obtains the pictures and the playing serial number corresponding to each picture in the pictures from the storage server, the first user terminal plays the pictures based on a playing sequence indicated by the playing serial number corresponding to each picture, wherein the playing serial number corresponds to each picture being matched with a position of the picture in the video.

In some embodiments of the present application, the operation of playing the pictures based on a playing sequence indicated by the playing serial number corresponding to each picture includes: broadcasting the pictures based on a time sequence indicated by the timestamp corresponding to each picture. It is understandable that the first user terminal broadcasts the pictures based on a playing sequence indicated by the playing serial number corresponding to each picture, thus being favorable to show a video recovery effect to certain degree.

In some embodiments of the present application, the storage server or the screenshot server may transmit an access address corresponding to the pictures to a site server such that the site server embeds the access address into a webpage source code transmitted to the first user terminal. The first user terminal may obtain a plurality of pictures from the storage server based on the embedded picture access address in the webpage source code.

Known from above, a technical solution of the present embodiment introduces a screenshot server, which obtains a video from a video server; captures a plurality of pictures from the video based on a preset screenshot strategy; and stores the pictures into a storage server such that a first user terminal obtains the pictures from the storage server to play. Since the screenshot server obtains the video from the video server, captures a plurality of pictures from the video and stores into the storage server, so that the user terminal may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

According to another embodiment of a video processing method of the present disclosure, the method may comprise: obtaining, by a first user terminal, a webpage source code from a site server; obtaining, by the first user terminal, a plurality of pictures from a storage server based on an embedded picture access address in the webpage source code, the pictures being captured by the screenshot server based on a preset screenshot strategy from a video from a video server; and broadcasting, by the first user terminal, the pictures.

Figure 2:
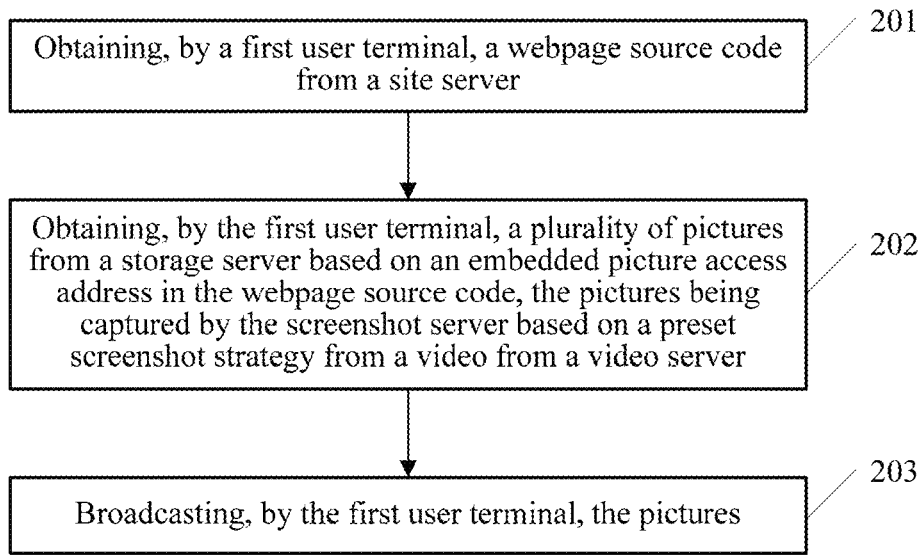
FIG. 2 is a flow schematic diagram of another video processing method according to an embodiment of the present application.

Referring to FIG. 2 which is a flow schematic diagram of another video processing method according to an embodiment of the present application. As shown in FIG. 2, a video processing method provided in another embodiment of the present application may comprise:

201, Obtaining, by a first user terminal, a webpage source code from a site server.

In some embodiments of the present application, the storage server or the screenshot server may transmit an access address corresponding to the pictures to a site server such that the site server embeds the access address into a webpage source code transmitted to the first user terminal.

202, Obtaining, by the first user terminal, a plurality of pictures from a storage server based on an embedded picture access address in the webpage source code, the pictures being captured by the screenshot server from a video from a video server based on a preset screenshot strategy, each picture having associated playing order information.

In some embodiments of the present application, the preset screenshot strategy may be to capture a plurality of pictures from the video according to a certain capturing frequency, or capture a plurality of pictures from the video according to multiple set capturing time points, and of course the preset screenshot strategy can be specifically set according to actual scene demands.

203, Broadcasting, by the first user terminal, the pictures according to their associated playing order information.

In some embodiments of the present application, the screenshot server may generate a timestamp corresponding to each picture in the pictures and store the timestamp corresponding to each picture into the storage server such that after the first user terminal obtains the pictures and the timestamp corresponding to each picture in the pictures from the storage server, playing the pictures based on a time sequence indicated by the timestamp corresponding to each picture, wherein the timestamp corresponds to each picture being used for indicating a time position of the picture in the video.

In some embodiments of the present application, the operation of playing the pictures based on a time sequence indicated by the timestamp corresponding to each picture includes: broadcasting the pictures based on a time sequence indicated by the timestamp corresponding to each picture. It is understandable that the first user terminal broadcasts the pictures based on a time sequence indicated by the timestamp corresponding to each picture, thus being favorable to show a video recovery effect to certain degree.

In some embodiments of the present application, the screenshot server may generate a playing serial number corresponding to each picture in the pictures, and stores the playing serial number corresponding to each picture into the storage server such that after the first user terminal obtains the pictures and the playing serial number corresponding to each picture in the pictures from the storage server, playing the pictures based on a playing sequence indicated by the playing serial number corresponding to each picture, wherein the playing serial number corresponds to each picture being matched with a position of the picture in the video.

In some embodiments of the present application, the operation of playing the pictures based on a playing sequence indicated by the playing serial number corresponding to each picture includes: broadcasting the pictures based on a time sequence indicated by the timestamp corresponding to each picture. It is understandable that the first user terminal broadcasts the pictures based on a playing sequence indicated by the playing serial number corresponding to each picture, thus being favorable to show a video recovery effect to certain degree.

Known from above, a technical solution of the present embodiment introduces a screenshot server, which obtains a video from a video server; captures a plurality of pictures from the video based on a preset screenshot strategy; and stores the pictures into a storage server such that a first user terminal obtains the pictures from the storage server to play. Since the screenshot server obtains the video from the video server, captures a plurality of pictures from the video and stores into the storage server, so that the user terminal may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

For the purpose of better understanding and implementing above aspects of the embodiments of the present application, plural application scenes are taken as examples for further description.

Figure 3:
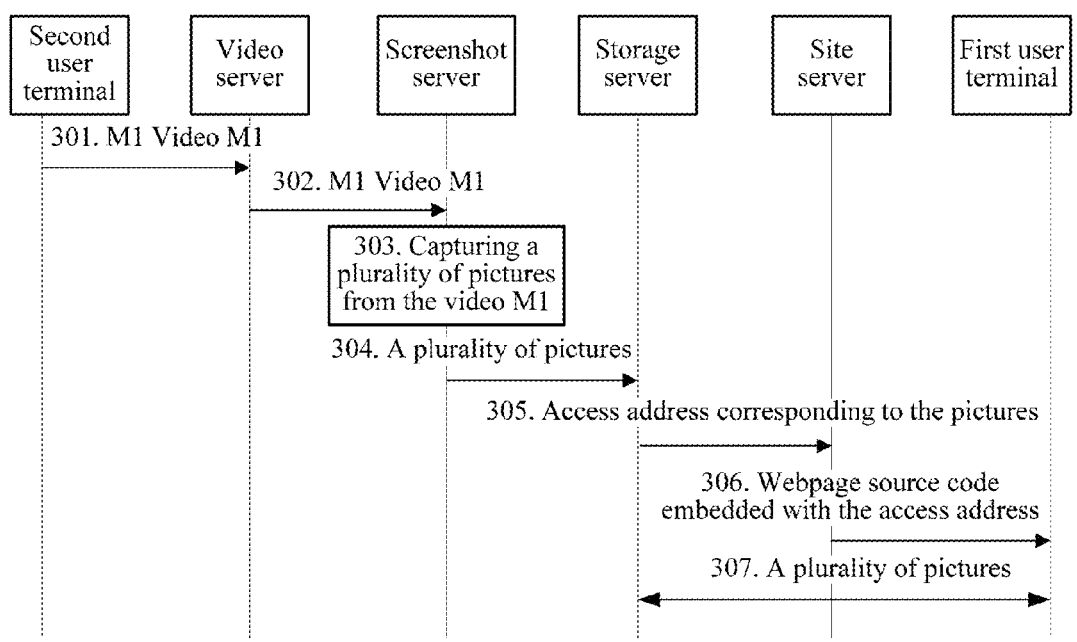
FIG. 3 is a flow schematic diagram of another video processing method according to an embodiment of the present application

Referring to FIG. 3 which is a flow schematic diagram of another video processing method according to an embodiment of the present application. As shown in FIG. 3, a video processing method provided in another embodiment of the present application may comprise:

301, uploading, by a second user terminal, a video M1 to a video server;

For example, when a certain user terminal (called as a second user terminal for the purpose of quote) establishes connection with a video server, the second user terminal may upload a video (for example a live broadcasting video) to the video server, which receives the video uploaded by the second user terminal, wherein the second user terminal transmitting the video belongs to a certain user (called as a second user).

The user terminal denoted in each embodiment of the present application may be a personal computer, a cellphone, a personal digital processing device, or other types of user terminals.

In some embodiments of the present application, after receiving the video from the second user terminal, the video server, based on multiple hash algorithms, queries whether a record used for identifying a mapping relation between the second user and a video channel is stored in a mapping record storage region thereof.

In some embodiments of the present application, before receiving the video M1 from the second user terminal, the video sever has allocated the video channel to the second user or not (the video server may never allocate the video channel to the second user before, or reallocates the video channel allocated to the second user before to other users, or resets the video channel allocated to the second user before to an idle video channel, wherein the idle video channel does not belong to any user). The video channel is a storage resource (for example a memory resource) used for storing the video in the video server, and a timestamp (the timestamp is used for recording the latest use time of the video channel) may be recorded in the video channel and information such as a user identifier of the user belonging to the video channel may also be recorded in the video channel.

If querying that no record used for identifying a mapping relation between the second user and the video channel is stored in above mapping record storage region, the video server allocates a first video channel in an idle state at current to the second user, and writes the video M1 into the first video channel.

If the video sever queries that no record used for identifying a mapping relation between the second user and the video channel is stored in above mapping record storage region, it is indicated that the video server possibly allocates no video channel to the second user at current.

In some embodiments of the present application, the allocating a first video channel in an idle state at current to the second user may include: allocating a first video channel in an idle state at current to the second user based on an idle chain table, wherein video channel identifiers corresponding to a plurality of video channels including the first video channel in an idle state at current are stored in the idle chain table, and the video channel identifier of the first video channel is recorded at a head or tail or any position in the idle chain table.

In some embodiments of the present application, the video server may further identify that the first video channel belongs to the second user in the first video channel (for example, may writes the user identifier of the second user into the first video channel).

In some embodiments of the present application, the video server may further generate a first record used for identifying a mapping relation between the second user and the video channel, calculates to obtain a first storage address based on the multiple hash algorithms, and writes the first record into a first storage space directed by the first storage address, wherein the first storage space belongs to above mapping record storage region.

In some embodiments of the present application, if writing the video M1 into the first video channel, the video server may further update a timestamp of the first video channel, it is understandable that time indicated by the timestamp of the first video channel updated by the video server may be the time of writing the video M1 into the first video channel.

In some embodiments of the present application, input of above multiple hash algorithms is for example a user code of the second user (wherein the user code is a plurality of numbers), and the user code of the second user is the user identifier of the second user or obtained by converting the user identifier of the second user.

In some embodiments of the present application, $K \geq N*M*P$, wherein K is the size of the total storage space of the mapping record storage region, M is a total number of the video channels capable of being provided by the video server, and P is the size of the storage space occupied storing one record used for identifying a mapping relation between the second user and the video channel, N is a positive integer, and for example, N may be 1, 2, 3, 4, 5, 6 or other values.

For instance, P is equal to 10 bytes, M is equal to 100, and N is equal to 6, then K may be larger than or equal to 6000 bytes. Since an addressing space of the mapping record region is larger than or equal to a storage space occupied by all video channels capable of being provided by the video server, it is favorable to allocate the video channels capable of being provided by the video server as fully as possible, and to improve a use rate of the video channels.

For example, the mapping record storage region may comprise at least N mapping record sub-storage regions, a storage space of each mapping record sub-storage region is larger than or equal to M*P, wherein M is a total number of the video channels capable of being provided by the video server, and P is the size of the storage space occupied storing one record used for identifying a mapping relation between the second user and the video channel. In such a scene, each hash algorithm in the multiple hash algorithms corresponds to a different mapping record sub-record region, a denominator of each hash algorithm is different and may be a prime number smaller than M.

In some embodiments of the present application, the method further comprises: if querying that a second record used for indicating a mapping relation between the second user and a second video channel exists in the mapping record storage region, the video server writes the video M1 into the second video channel. In addition, the video server may further identify that the second video channel belongs to the second user in the second video channel (for example, may writes the user identifier of the second user into the second video channel).

If the video sever queries that the second record used for identifying a mapping relation between the second user and the second video channel is stored in above mapping record storage region, it is indicated that the video server has allocated the second video channel to the second user before.

In some embodiments of the present application, when meeting set channel reset conditions, the video server may further reset part or all currently overtime video channels to be idle video channels. In some embodiments of the present application, the overtime video channels refer to that lag of time indicated by the timestamp corresponding to such video channel relative to current time exceeds a first duration threshold value, wherein the duration threshold value may be, for example, one second, two seconds, three seconds, or other durations set according to actual demands. The overtime video channels belong to a certain user. For example, when it is detected that the first video channel or the second video channel is overtime, the video sever resets the first video channel or the second video channel to be the idle video channel and may record the video channel identifier of the first video channel or the second video channel reset to be idle on a head or tail or any position in above idle chain table. Further, if resetting the first video channel or the second video channel to the idle video channels, the video server may further delete a record used for identifying a mapping relation between the second user and the second video channel stored in above mapping record storage region.

In some embodiments of the present application, the channel reset conditions may be various feasible conditions set according to actual scene demands. For example, the channel reset conditions may comprise at least one of following conditions: the quantity of the currently idle video channels is less than a set first threshold value (for example 10 or other values), a ratio of the quantity of the currently idle video channels to the total channel quantity is less than a set second threshold value (for example 15% or other values), an overtime video channel reset command is received, the quantity of the currently idle video channels is larger than a set third threshold value (for example 20 or other values), a set reset period (for example, one minute, two minutes or other values) is up, a ratio of the quantity of the currently idle video channels to the total channel quantity is larger than a set fourth threshold value (for example 50% or other values), and a ratio of the quantity of the currently idle video channels to the quantity of the currently idle video channels is larger than a set fifth threshold value (for example 1 or other values).

Values of respective threshold values (for example, the first threshold value, second threshold value, third threshold value, fourth threshold value and fifth threshold value) of the embodiments of the present application may be set according to specific scene demands as long as meeting actual demands.

It can be seen that the video server may specifically develop the mapping record storage region to store the record used for identifying a mapping relation between the user and the video channel, and queries whether a record used for identifying a mapping relation between the second user and the video channel is stored in the mapping record storage region based on multiple hash algorithms, indexing efficiency of the user video channel is greatly improved due to such a technology indexing the video channels of the user.

Of course, the video server may cache the video uploaded by the second user in other manners.

302: Obtaining, by a screenshot server, the video M1 from a video server.

303: Capturing, by the screenshot server, a plurality of pictures from the video M1 based on a preset screenshot strategy.

In some embodiments of the present application, the preset screenshot strategy may be to capture a plurality of pictures from the video according to a certain capturing frequency, or capture a plurality of pictures from the video M1 according to multiple set capturing time points, and of course the preset screenshot strategy can be specifically set according to actual scene demands.

304, Storing, by the screenshot server, the pictures into a storage server.

305, Transmitting, by the storage server, an access address corresponding to the pictures to a site server.

The pictures correspond to one access address, or each of the pictures corresponds to one access address.

306, Transmitting, by a site server, a web source code embedded with the access address, to a first user terminal.

307, Obtaining, by the first user terminal, the pictures from the storage server based on the access address to broadcast.

In some embodiments of the present application, the screenshot server may generate a timestamp corresponding to each picture in the pictures and store the timestamp corresponding to each picture into the storage server such that after the first user terminal obtains the pictures and the timestamp corresponding to each picture in the pictures from the storage server, playing the pictures based on a time sequence indicated by the timestamp corresponding to each picture, wherein the timestamp corresponds to each picture being used for indicating a time position of the picture in the video.

In some embodiments of the present application, the operation of playing the pictures based on a time sequence indicated by the timestamp corresponding to each picture includes: broadcasting the pictures based on a time sequence indicated by the timestamp corresponding to each picture. It is understandable that the first user terminal broadcasts the pictures based on a time sequence indicated by the timestamp corresponding to each picture, thus being favorable to show a video recovery effect to certain degree.

In some embodiments of the present application, the screenshot server may generate a playing serial number corresponding to each picture in the pictures, and stores the playing serial number corresponding to each picture into the storage server such that after the first user terminal obtains the pictures and the playing serial number corresponding to each picture in the pictures from the storage server, playing the pictures based on a playing sequence indicated by the playing serial number corresponding to each picture, wherein the playing serial number corresponds to each picture being matched with a position of the picture in the video.

In some embodiments of the present application, the operation of playing the pictures based on a playing sequence indicated by the playing serial number corresponding to each picture includes: broadcasting the pictures based on a time sequence indicated by the timestamp corresponding to each picture. It is understandable that the first user terminal broadcasts the pictures based on a playing sequence indicated by the playing serial number corresponding to each picture, thus being favorable to show a video recovery effect to certain degree.

Known from above, a technical solution of the present embodiment introduces a screenshot server, which obtains a video from a video server; captures a plurality of pictures from the video based on a preset screenshot strategy; and stores the pictures into a storage server such that a first user terminal obtains the pictures from the storage server to play. Since the screenshot server obtains the video from the video server, captures a plurality of pictures from the video and stores into the storage server, so that the user terminal may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

According to one embodiment of a video channel managing method of the present application, the method may comprise: receiving, by a video server, first video data; querying whether a record used for identifying a mapping relation between a first user and a video channel is stored in a mapping record storage region based on multiple hash algorithms, the first video data belonging to the first user; and if it is queried that a record used for identifying a mapping relation between a first user and a video channel is not stored in a mapping record storage region, allocating a first video channel in an idle state at current to the first user, and writing the first video data into the first video channel.

For example, when a certain user terminal (called as a second user terminal for the purpose of quote) establishes connection with a video server, the second user terminal may upload a video (called as the first video data for the purpose of quote) to the video server, which receives the video uploaded by the second user terminal, wherein the second user terminal transmitting the video belongs to a certain user (called as a first user).

The user terminal denoted in each embodiment of the present application may be a personal computer, a cellphone, a personal digital processing device, or other types of user terminals.

A first video data pack may be a live broadcasting video data pack and of course may be other types of video data packs.

In some embodiments of the present application, before receiving the first data video, the video sever allocates the video channel to the first user or not (the video server may never allocate the video channel to the first user before, or reallocates the video channel allocated to the first user before to other users, or resets the video channel allocated to the first user before to an idle video channel, wherein the idle video channel does not belong to any user).

The video channel is a storage resource (for example a memory resource) used for storing the video in the video server, and a timestamp (the timestamp is used for recording the latest use time of the video channel) may be recorded in the video channel and information such as a user identifier of the user belonging to the video channel may also be recorded in the video channel.

If the video sever queries that no record used for identifying a mapping relation between the second user and the video channel is stored in above mapping record storage region, it is indicated that the video server possibly allocates no video channel to the first user at current.

In some embodiments of the present application, the allocating a first video channel in an idle state at current to the first user may include: allocating a first video channel in an idle state at current to the first user based on an idle chain table, wherein video channel identifiers corresponding to a plurality of video channels including the first video channel in an idle state at current are stored in the idle chain table, and the video channel identifier of the first video channel is recorded at a head or tail or any position in the idle chain table.

In some embodiments of the present application, the video server may further identify that the first video channel belongs to the first user in the first video channel (for example, may writes the user identifier of the first user into the first video channel).

In some embodiments of the present application, the video server may further generate a first record used for identifying a mapping relation between the first user and the video channel, calculates to obtain a first storage address based on the multiple hash algorithms, and writes the first record into a first storage space directed by the first storage address, wherein the first storage space belongs to above mapping record storage region.

In some embodiments of the present application, when writing the first video data into the first video channel, the video server may further update a timestamp of the first video channel, it is understandable that time indicated by the timestamp of the first video channel updated by the video server may be the time of writing the first video data into the first video channel.

In some embodiments of the present application, input of above multiple hash algorithms is for example a user code of the first user (wherein the user code is a plurality of numbers), and the user code of the first user is the user identifier of the first user or obtained by converting the user identifier of the first user.

In some embodiments of the present application, K≥N*M*P, wherein K is the size of the total storage space of the mapping record storage region, M is a total number of the video channels capable of being provided by the video server, and P is the size of the storage space occupied storing one record used for identifying a mapping relation between the second user and the video channel, N is a positive integer, and for example, N may be 1, 2, 3, 4, 5, 6 or other values.

For instance, P is equal to 10 bytes, M is equal to 100, and N is equal to 6, then K may be larger than or equal to 6000 bytes. Since an addressing space of the mapping record region is larger than or equal to a storage space occupied by all video channels capable of being provided by the video server, it is favorable to allocate the video channels capable of being provided by the video server as fully as possible, and to improve a use rate of the video channels.

For example, the mapping record storage region may comprise at least N mapping record sub-storage regions, a storage space of each mapping record sub-storage region is larger than or equal to M*P, wherein M is a total number of the video channels capable of being provided by the video server, and P is the size of the storage space occupied storing one record used for identifying a mapping relation between the second user and the video channel. In such a scene, each hash algorithm in the multiple hash algorithms corresponds to a different mapping record sub-record region, a denominator of each hash algorithm is different and may be a prime number smaller than M.

In some embodiments of the present application, the method further comprises: if querying a second record used for indicating a mapping relation between the first user and a second video channel, the video server writes the first video data into the second video channel. In addition, the video server may further identify that the second video channel belongs to the first user in the second video channel (for example, may writes the user identifier of the first user into the second video channel).

If the video sever queries that the second record used for identifying a mapping relation between the second user and the second video channel is stored in above mapping record storage region, it is indicated that the video server has allocated the second video channel to the first user before.

In some embodiments of the present application, when meeting set channel reset conditions, the video server may further reset part or all currently overtime video channels to be idle video channels. In some embodiments of the present application, the overtime video channels refer to that lag of time indicated by the timestamp corresponding to such video channel relative to current time exceeds a first duration threshold value, wherein the duration threshold value may be, for example, one second, two seconds, three seconds, or other durations set according to actual demands. The overtime video channels belong to a certain user. For example, when it is detected that the first video channel or the second video channel is overtime, the video sever resets the first video channel or the second video channel to be the idle video channel and may record the video channel identifier of the first video channel or the second video channel reset to be idle on a head or tail or any position in above idle chain table. Further, if resetting the first video channel or the second video channel to the idle video channels, the video server may further delete a record used for identifying a mapping relation between the first user and the second video channel stored in above mapping record storage region.

In some embodiments of the present application, the channel reset conditions may be various feasible conditions set according to actual scene demands. For example, the channel reset conditions may comprise at least one of following conditions: the quantity of the currently idle video channels is less than a set first threshold value (for example 10 or other values), a ratio of the quantity of the currently idle video channels to the total channel quantity is less than a set second threshold value (for example 15% or other values), an overtime video channel reset command is received, the quantity of the currently idle video channels is larger than a set third threshold value (for example 20 or other values), a set reset period (for example, one minute, two minutes or other values) is up, a ratio of the quantity of the currently idle video channels to the total channel quantity is larger than a set fourth threshold value (for example 50% or other values), and a ratio of the quantity of the currently idle video channels to the quantity of the currently idle video channels is larger than a set fifth threshold value (for example 1 or other values).

Values of respective threshold values (for example, the first threshold value, second threshold value, third threshold value, fourth threshold value and fifth threshold value) of the embodiments of the present application may be set according to specific scene demands as long as meeting actual demands.

It is understandable that when the set channel reset conditions are met, resetting part or all currently overtime video channels to be idle video channels, based on such a mechanism, the video server can obtain the idle video channels in batch, thus providing a foundation for subsequently improving use efficiency of the video channels.

In some embodiments of the present application, the when the set channel reset conditions are met, resetting part or all currently overtime video channels to be idle video channels may include:

resetting part or all currently overtime video channels to be idle video channels when the quantity of the currently idle video channels is less than a set first threshold value, or resetting part or all currently overtime video channels to be idle video channels when a ratio of the quantity of the currently idle video channels to the total channel quantity is less than a set second threshold value, or resetting part or all currently overtime video channels to be idle video channels when an overtime video channel reset command is received, or resetting part or all currently overtime video channels to be idle video channels when a set reset period is up, or resetting part or all currently overtime video channels to be idle video channels when the quantity of the currently idle video channels is larger than a set third threshold value, or resetting part or all currently overtime video channels to be idle video channels when a ratio of the quantity of the currently idle video channels to the total channel quantity is larger than a set fourth threshold value, or resetting part or all currently overtime video channels to be idle video channels when a ratio of the quantity of the currently idle video channels to the quantity of the currently idle video channels is larger than a set fifth threshold value.

It can be seen that in the embodiments of the present application, after the video server receives the first video data, whether a record used for identifying a mapping relation between a first user and a video channel is stored in a mapping record storage region is queried based on multiple hash algorithms, wherein the first video data belongs to the first user; and if it is queried that a record used for identifying a mapping relation between a first user and a video channel is not stored in a mapping record storage region, a first video channel in an idle state at current is allocated to the first user, and the first video data is written into the first video channel. Since the video server may specifically develop the mapping record storage region to store the record used for identifying a mapping relation between the user and the video channel, and queries whether a record used for identifying a mapping relation between the second user and the video channel is stored in the mapping record storage region based on multiple hash algorithms, indexing efficiency of the user video channel is greatly improved due to such a technology indexing the video channels of the user.

In step 301, a processing manner of the video server for the video uploaded by the user terminal is described by give an example.

Figure 4:
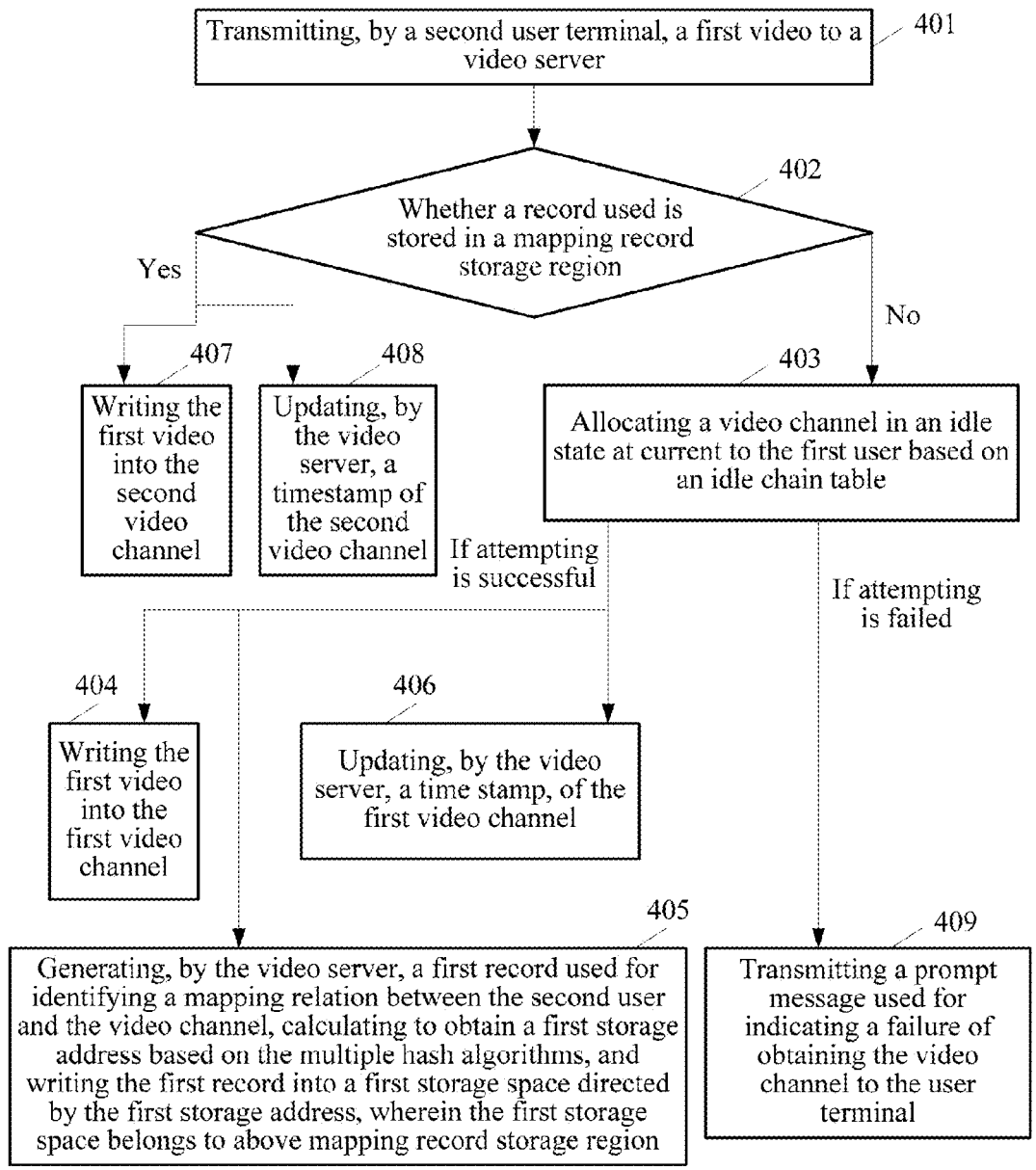
FIG. 4 is a flow schematic diagram of a video channel managing method according to an embodiment of the present application.

Referring to FIG. 4, which is a flow schematic diagram of a video channel allocating managing method according to an embodiment of the present application. As shown in FIG. 4, a video channel allocating managing method provided in an embodiment of the present application may comprise:

401, Transmitting, by a second user terminal, a first video to a video server.

402, Receiving, by the video server, the first video of the second user terminal, and querying, by the video server, whether a record used for identifying a mapping relation between a first user and the video channel is stored in a mapping record storage region based on multiple hash algorithms, the first video data belonging to the first user.

If the video server queries that a record used for identifying a mapping relation between a first user and the video channel is not stored in the mapping record storage region, a step 403 is executed; and if the video server queries that a second record used for identifying a mapping relation between the first user and a second video channel is stored in the mapping record storage region, steps 407 and 408 are executed.

If the video server queries that a record used for identifying a mapping relation between the first user and the video channel is not stored in the mapping record storage region, it is indicated that the video server possibly allocates no video channel to the first user at current. If the video server queries that a second record used for identifying a mapping relation between the first user and a second video channel is stored in the mapping record storage region, it is indicated that the video server has allocated a second video channel to the first user before.

In some embodiments of the present application, before receiving a first video from the second user terminal, the video sever has allocated the video channel to the second user or not (the video server may never allocate the video channel to the second user before, or reallocates the video channel allocated to the second user before to other users, or resets the video channel allocated to the second user before to an idle video channel, wherein the idle video channel does not belong to any user).

The video channel is a storage resource (for example a memory resource) used for storing the video in the video server, and a timestamp (the timestamp is used for recording the latest use time of the video channel) may be recorded in the video channel and information such as a user identifier of the user belonging to the video channel may also be recorded in the video channel.

403, When the video server queries that a record used for identifying a mapping relation between the first user and the video channel is not stored in the mapping record storage region, attempting to allocate a video channel in an idle state at current to the first user based on an idle chain table;

If a first video channel in an idle state at current is successfully allocated to the first user based on an idle chain table, steps 404, 405 and 406 are executed; and if any video channel in an idle state at current is not successfully allocated to the first user based on an idle chain table, a step 409 is executed.

404, Writing the first video into the first video channel.

Video channel identifiers corresponding to a plurality of video channels including the first video channel in an idle state at current are stored in the idle chain table, and the video channel identifier of the first video channel is recorded at a head or tail or any position in the idle chain table.

In some embodiments of the present application, the video server may further identify that the second video channel belongs to the first user in the first video channel (for example, may writes the user identifier of the first user into the second video channel).

405, Generating, by the video server, a first record used for identifying a mapping relation between the second user and the video channel, calculating to obtain a first storage address based on the multiple hash algorithms, and writing the first record into a first storage space directed by the first storage address, wherein the first storage space belongs to above mapping record storage region.

406, Updating, by the video server, a time stamp, of the first video channel.

It is understandable that time indicated by the updated timestamp of the first video channel is the time of writing the first video into the first video channel, and steps 404-406 may be random in an execution sequence and have no necessary precedence sequence.

In some embodiments of the present application, input of above multiple hash algorithms is for example a user code of the first user (wherein the user code is a plurality of numbers), and the user code of the first user is the user identifier of the first user or obtained by converting the user identifier of the first user.

In some embodiments of the present application, K≥N*M*P, wherein K is the size of the total storage space of the mapping record storage region, M is a total number of the video channels capable of being provided by the video server, and P is the size of the storage space occupied storing one record used for identifying a mapping relation between the second user and the video channel, N is a positive integer, and for example, N may be 1, 2, 3, 4, 5, 6 or other values.

For instance, P is equal to 10 bytes, M is equal to 100, and N is equal to 6, then K may be larger than or equal to 6000 bytes. Since an addressing space of the mapping record region is larger than or equal to a storage space occupied by all video channels capable of being provided by the video server, it is favorable to allocate the video channels capable of being provided by the video server as fully as possible, and to improve a use rate of the video channels.

For example, the mapping record storage region may comprise at least N mapping record sub-storage regions, a storage space of each mapping record sub-storage region is larger than or equal to M*P, wherein M is a total number of the video channels capable of being provided by the video server, and P is the size of the storage space occupied storing one record used for identifying a mapping relation between the second user and the video channel. In such a scene, each hash algorithm in the multiple hash algorithms corresponds to a different mapping record sub-record region, a denominator of each hash algorithm is different and may be a prime number smaller than M.

407, Writing, by the video server, the first video into the second video channel if querying that a second record used for indicating a mapping relation between the first user and the second video channel is stored in the mapping record storage region.

In some embodiments of the present application, the video server may further identify that the second video channel belongs to the first user in the second video channel (for example, may writes the user identifier of the first user into the second video channel).

408, Updating, by the video server, a timestamp of the second video channel.

It is understandable that time indicated by the updated timestamp of the second video channel is the time of writing the first video into the second video channel, and steps 407-408 may be random in an execution sequence and have no necessary precedence sequence.

409, Transmitting, by the video server, a prompt message used for indicating a failure of obtaining the video channel to the user terminal.

In some embodiments of the present application, when meeting set channel reset conditions, the video server may further reset part or all currently overtime video channels to be idle video channels. In some embodiments of the present application, the overtime video channels refer to that lag of time indicated by the timestamp corresponding to such video channel relative to current time exceeds a first duration threshold value, wherein the duration threshold value may be, for example, one second, two seconds, three seconds, or other durations set according to actual demands. The overtime video channels belong to a certain user. For example, when it is detected that the first video channel or the second video channel is overtime, the video sever resets the first video channel or the second video channel to be the idle video channel and may record the video channel identifier of the first video channel or the second video channel reset to be idle on a head or tail or any position in above idle chain table. Further, if resetting the first video channel or the second video channel to the idle video channels, the video server may further delete a record used for identifying a mapping relation between the first user and the second video channel stored in above mapping record storage region.

In some embodiments of the present application, the channel reset conditions may be various feasible conditions set according to actual scene demands. For example, the channel reset conditions may comprise at least one of following conditions: the quantity of the currently idle video channels is less than a set first threshold value (for example 10 or other values), a ratio of the quantity of the currently idle video channels to the total channel quantity is less than a set second threshold value (for example 15% or other values), an overtime video channel reset command is received, the quantity of the currently idle video channels is larger than a set third threshold value (for example 20 or other values), a set reset period (for example, one minute, two minutes or other values) is up, a ratio of the quantity of the currently idle video channels to the total channel quantity is larger than a set fourth threshold value (for example 50% or other values), and a ratio of the quantity of the currently idle video channels to the quantity of the currently idle video channels is larger than a set fifth threshold value (for example 1 or other values).

Values of respective threshold values (for example, the first threshold value, second threshold value, third threshold value, fourth threshold value and fifth threshold value) of the embodiments of the present application may be set according to specific scene demands as long as meeting actual demands.

It is understandable that when the set channel reset conditions are met, resetting part or all currently overtime video channels to be idle video channels, based on such a mechanism, the video server can obtain the idle video channels in batch, thus providing a foundation for subsequently improving use efficiency of the video channels.

In some embodiments of the present application, the when the set channel reset conditions are met, resetting part or all currently overtime video channels to be idle video channels may include:

resetting part or all currently overtime video channels to be idle video channels when the quantity of the currently idle video channels is less than a set first threshold value, or resetting part or all currently overtime video channels to be idle video channels when a ratio of the quantity of the currently idle video channels to the total channel quantity is less than a set second threshold value, or resetting part or all currently overtime video channels to be idle video channels when an overtime video channel reset command is received, or resetting part or all currently overtime video channels to be idle video channels when a set reset period is up, or resetting part or all currently overtime video channels to be idle video channels when the quantity of the currently idle video channels is larger than a set third threshold value, or resetting part or all currently overtime video channels to be idle video channels when a ratio of the quantity of the currently idle video channels to the total channel quantity is larger than a set fourth threshold value, or resetting part or all currently overtime video channels to be idle video channels when a ratio of the quantity of the currently idle video channels to the quantity of the currently idle video channels is larger than a set fifth threshold value.

It can be seen that in the embodiments of the present application, after the video server receives the first video data, whether a record used for identifying a mapping relation between a first user and a video channel is stored in a mapping record storage region is queried based on multiple hash algorithms, wherein the first video data belongs to the first user; and if it is queried that a record used for identifying a mapping relation between a first user and a video channel is not stored in a mapping record storage region, a first video channel in an idle state at current is allocated to the first user, and the first video data is written into the first video channel. Since the video server may specifically develop the mapping record storage region to store the record used for identifying a mapping relation between the user and the video channel, and queries whether a record used for identifying a mapping relation between the second user and the video channel is stored in the mapping record storage region based on multiple hash algorithms, indexing efficiency of the user video channel is greatly improved due to such a technology indexing the video channels of the user.

In order to better understand and implement above solutions of the embodiments of the present application, a more specific application scene is taken as an example for further description.

Assuming that the video server may provide 1000 video channels. The mapping record storage region may comprise at least 6 mapping record sub-storage regions (that is the mapping record sub-storage regions s1-s6), and a space size of each mapping record sub-storage region is larger than or equal to 1000*P, wherein the P is the size of the storage space occupied storing one record used for identifying a mapping relation between the second user and the video channel.

Assuming that the video server receives a video s1 from a user terminal a, wherein the video s1 carries a user identifier of the user A; based on multiple hash algorithms, the video server takes the user identifier of the user A as input of the multiple hash algorithms, and queries whether a record used for identifying a mapping relation between the user A and the video channel is stored in the mapping record storage region.

Assuming that the hash algorithms are modular operation, the user identifier of the use A is 100000000, if a denominator of the hash algorithm is 997 (prime number), then a calculated result of the hash algorithm is 100000000%997=900. In some embodiments, if a maximal hash space is set to be 1000, a hash order is 6, and then a hash function denominator of each hash order may be different from other denominators of hash functions of other orders, and is smaller than the maximal prime number of the hash space size. For example, the hash function denominator of the six order hash may be 997, 991, 983, 977, 971 and 967 respectively.

Assuming that the user identifier is 100000000, then a specific manner of querying whether a record used for identifying a mapping relation between the user A and the video channel is stored in the mapping record storage region may include:

Step a, 100000000%997=900, obtaining a video channel identifier in the record if the record used for identifying a mapping relation between the user A and the video channel is stored in a storage space corresponding to a storage address 900 in a mapping record sub-storage region s1; and executing a step b if the record used for identifying a mapping relation between the user A and the video channel is not stored in a storage space corresponding to the storage address 900 in the mapping record sub-storage region s1.

Step b, 100000000%991=172, obtaining a video channel identifier in the record if the record used for identifying a mapping relation between the user A and the video channel is stored in a storage space corresponding to a storage address 172 in a mapping record sub-storage region s2; and executing a step c if the record used for identifying a mapping relation between the user A and the video channel is not stored in a storage space corresponding to the storage address 172 in the mapping record sub-storage region s2.

Step c, 100000000%983=393, obtaining a video channel identifier in the record if the record used for identifying a mapping relation between the user A and the video channel is stored in a storage space corresponding to a storage address 393 in a mapping record sub-storage region s3; and executing a step d if the record used for identifying a mapping relation between the user A and the video channel is not stored in a storage space corresponding to the storage address 393 in the mapping record sub-storage region s3.

Step d, 100000000%977=142, obtaining a video channel identifier in the record if the record used for identifying a mapping relation between the user A and the video channel is stored in a storage space corresponding to a storage address 142 in a mapping record sub-storage region s4; and executing a step e if the record used for identifying a mapping relation between the user A and the video channel is not stored in a storage space corresponding to the storage address 142 in the mapping record sub-storage region s4.

Step e, 100000000%971=594, obtaining a video channel identifier in the record if the record used for identifying a mapping relation between the user A and the video channel is stored in a storage space corresponding to a storage address 594 in a mapping record sub-storage region s5; and executing a step f if the record used for identifying a mapping relation between the user A and the video channel is not stored in a storage space corresponding to the storage address 594 in the mapping record sub-storage region s5.

Step f, 100000000%967=596, obtaining a video channel identifier in the record if the record used for identifying a mapping relation between the user A and the video channel is stored in a storage space corresponding to a storage address 596 in a mapping record sub-storage region s6; and returning back to query a record failure command if the record used for identifying a mapping relation between the user A and the video channel is not stored in a storage space corresponding to the storage address 596 in the mapping record sub-storage region s6.

If querying that a record used for identifying a mapping relation between the user A and a second video channel is stored in a mapping record storage region, the video server writes the first video into the second video channel based on a video channel identifier in the second video channel in the record.

In addition, if querying that a record used for identifying a mapping relation between the user A and a second video channel is not stored in a mapping record storage region, based on an idle chain table, the video server allocates a first video channel in an idle state at current to the user A, writes the first video into the first video channel and updates a timestamp of the first video channel. Further, the video server generates a first record used for identifying a mapping relation between the first user and the first video channel, calculates to obtain a first storage address based on multiple hash algorithms, and writes the first record into the first storage space directed by the first storage address, wherein, the first storage space belongs to the mapping record storage region.

A manner of obtaining the first storage address based on the multiple hash algorithms is similar to the manner of looking up that whether a record used for identifying a mapping relation between the user A and the video channel is stored in the mapping record storage region.

Assuming that the user identifier is 100000000, then a specific manner of obtaining the first storage address based on the multiple hash algorithms may include:

Step a2, 100000000%997=900, the first storage address being a storage address 900 if a storage space corresponding to the storage address 900 in a mapping record sub-storage region s1 is not occupied; and executing a step b2 if a storage space corresponding to the storage address 900 in the mapping record sub-storage region s1 is occupied.

Step b2, 100000000%991=172, the first storage address being a storage address 172 if a storage space corresponding to the storage address 172 in a mapping record sub-storage region s2 is not occupied; and executing a step c2 if a storage space corresponding to the storage address 172 in the mapping record sub-storage region s2 is occupied.

Step c2, 100000000%983=393, the first storage address being a storage address 393 if a storage space corresponding to the storage address 393 in a mapping record sub-storage region s3 is not occupied; and executing a step d2 if a storage space corresponding to the storage address 393 in the mapping record sub-storage region s3 is occupied.

Step d2, 100000000%977=142, the first storage address being a storage address 172 if a storage space corresponding to the storage address 142 in a mapping record sub-storage region s4 is not occupied; and executing a step e2 if a storage space corresponding to the storage address 142 in the mapping record sub-storage region s4 is occupied.

Step e2, 100000000%971=594, the first storage address being a storage address 594 if a storage space corresponding to the storage address 594 in a mapping record sub-storage region s5 is not occupied; and executing a step f2 if a storage space corresponding to the storage address 594 in the mapping record sub-storage region s5 is occupied.

Step f2, 100000000%967=596, the first storage address being a storage address 596 if a storage space corresponding to the storage address 596 in a mapping record sub-storage region s6 is not occupied; and returning back to an address allocating failure command if a storage space corresponding to the storage address 596 in the mapping record sub-storage region s6 is occupied.

It is understandable that the hash algorithms in the examples are one of executable hash algorithms, and other hash algorithms may be selected in actual application and are not repeated one by one herein.

In order to better implement above solutions of the embodiments of the present application, associated devices used for implementing above method are provided as follows.

Figure 5:
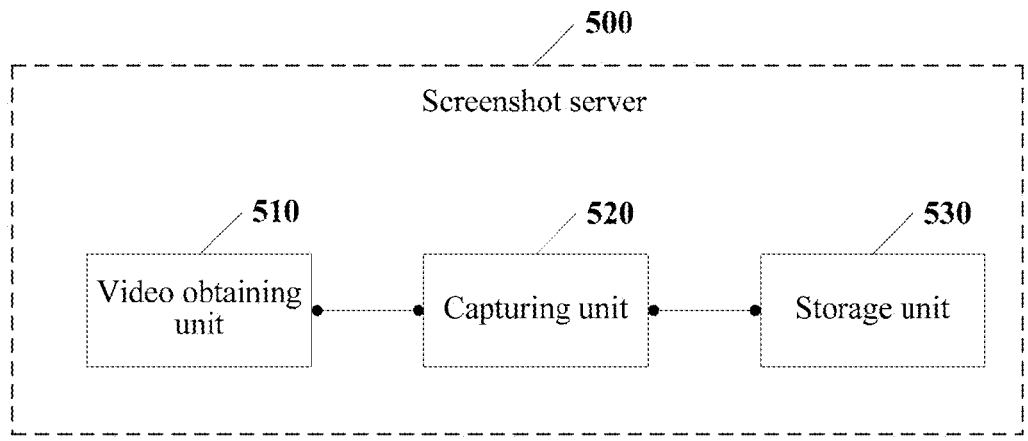
FIG. 5 is a schematic diagram of a screenshot server according to an embodiment of the present application.

Referring to FIG. 5, an embodiment of the present application provides a screenshot server 500, which may comprises:

a video obtaining unit 510, a capturing unit 520 and a storage unit 530.

The video obtaining unit 510 is configured to obtain a video from a video server;

The capturing unit 520 is configured to capture a plurality of pictures from the video based on a preset screenshot strategy.

The storage unit 530 is configured to store the pictures into the storage server such that a first user terminal obtains the pictures from the storage server to play.

In some embodiments of the present application, the screenshot server 500 may further comprises:

a timestamp unit, configured to generate a timestamp corresponding each picture in the pictures.

The storage unit 530 is further configured to store the timestamp corresponding to each picture into the storage server such that after the first user terminal obtains the pictures and the timestamp corresponding to each picture in the pictures from the storage server, the first user terminal plays the pictures based on a time sequence indicated by the timestamp corresponding to each picture, the timestamp corresponding to each picture being used for indicating a time position of the picture in the video.

In some embodiments of the present application, the screenshot server 530 may further comprises:

A serial number unit, configured to generate a playing serial number corresponding to each picture in the pictures.

The storage unit 530 is further configured to store the playing serial number corresponding to each picture into the storage server such that after the first user terminal obtains the pictures and the playing serial number corresponding to each picture in the pictures from the storage server, the first user terminal plays the pictures based on a playing sequence indicated by the playing serial number corresponding to each picture, the playing serial number corresponding to each picture being matched with a position of the picture in the video.

In some embodiments of the present application, the video obtaining unit 510 is specifically configured to obtain a live broadcasting video uploaded into the video server by a second user terminal.

In some embodiments of the present application, the screenshot server 500 may further comprise: an address unit, configured to transmit an access address corresponding to the pictures to a site server such that the site server embeds the access address into a webpage source code transmitted by the first user terminal.

It is understandable that functions of respective functional modules of the screenshot server 500 may be specifically implemented according to the method according to the embodiments of the method, and a specific implementing process may refer to related description of the embodiments of the method and is not repeated herein.

Known from above, a technical solution of the present embodiment introduces the screenshot server 500, which obtains the video from the video server, captures a plurality of pictures from the video based on the preset screenshot strategy, and stores the pictures into the storage server, and the first user terminal obtains the webpage source code from the site server, and obtains the pictures from the storage server based on the picture access address embedded into the webpage source code. Since the screenshot server obtains the video from the video server, captures a plurality of pictures from the video and stores into the storage server, so that the user terminal may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

Figure 6:
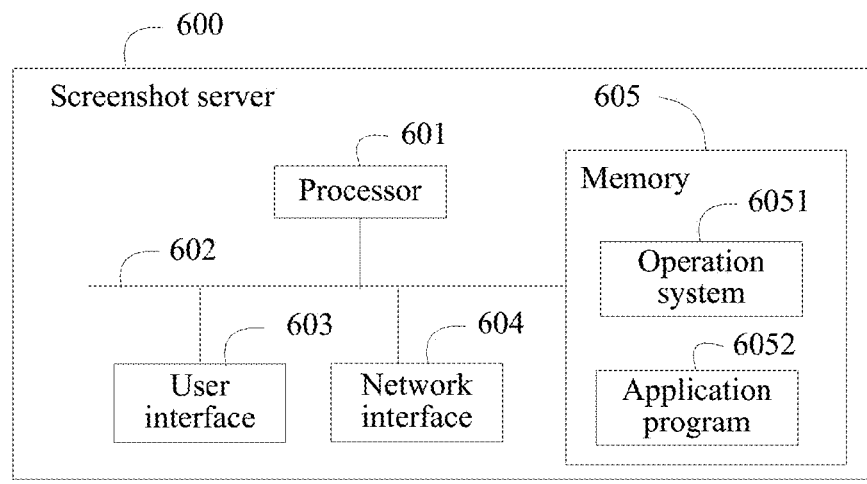
FIG. 6 is a schematic diagram of another screenshot server according to an embodiment of the present application.

Referring to FIG. 6, which is a structural block diagram of a screenshot server 600 according to another embodiment of the present application.

The screenshot server 600 may comprise: at least one processor 601, at least one network interface 604 or other user interfaces 603, a memory 605 and at least one communication bus 602. The communication bus 602 is configured to realizing connection communication among these components.

The screenshot server 600 may comprise a user interface 603, including a display (for example, a touch screen, an LCD, a CRT, Holographic or Projector), a knock device (for example, a mouse, a trackball, a touch panel or a touch screen), a camera and/or a pickup apparatus.

The memory 605 may include a read-only memory and a random access memory, and provides a command and data for the processor 601. A part of the memory 602 may further comprise a non-volatile random access memory (NVRAM).

In some embodiments, the memory 605 stores following elements: an executable module or data structure, or subsets thereof or supersets thereof.

An operation system 6051 includes various system programs, and is configured to realize various basic services and process hardware-based tasks.

An application program module 6052 contains various system programs and is configured to realize various application services.

The application program module 6052 includes but is not limited to a video obtaining unit 510, a capturing unit 520, a storage unit 530, a serial number unit 550 and/or a timestamp unit 540.

In the embodiments of the present application, by calling a program or command stored in the memory 605, the processor 601 obtains a video from a video server captures a plurality of pictures from the video based on a preset screenshot strategy, and stores the pictures into a storage server such that a first user terminal obtains the pictures from the storage server to play.

In some embodiments of the present application, the preset screenshot strategy may be to capture a plurality of pictures from the video according to a certain capturing frequency, or capture a plurality of pictures from the video according to multiple set capturing time points, and of course the preset screenshot strategy can be specifically set according to actual scene demands.

In some embodiments of the present application, the processor 601 may generate a timestamp corresponding to each picture in the pictures and store the timestamp corresponding to each picture into the storage server such that after the first user terminal obtains the pictures and the timestamp corresponding to each picture in the pictures from the storage server, playing the pictures based on a time sequence indicated by the timestamp corresponding to each picture, wherein the timestamp corresponds to each picture being used for indicating a time position of the picture in the video.

In some embodiments of the present application, the operation of playing the pictures based on a time sequence indicated by the timestamp corresponding to each picture includes: broadcasting the pictures based on a time sequence indicated by the timestamp corresponding to each picture. It is understandable that the first user terminal broadcasts the pictures based on a time sequence indicated by the timestamp corresponding to each picture, thus being favorable to show a video recovery effect to certain degree.

In some embodiments of the present application, the processor 601 may generate a playing serial number corresponding to each picture in the pictures, and stores the playing serial number corresponding to each picture into the storage server such that after the first user terminal obtains the pictures and the playing serial number corresponding to each picture in the pictures from the storage server, playing the pictures based on a playing sequence indicated by the playing serial number corresponding to each picture, wherein the playing serial number corresponds to each picture being matched with a position of the picture in the video.

In some embodiments of the present application, the operation of playing the pictures based on a playing sequence indicated by the playing serial number corresponding to each picture includes: broadcasting the pictures based on a time sequence indicated by the timestamp corresponding to each picture. It is understandable that the first user terminal broadcasts the pictures based on a playing sequence indicated by the playing serial number corresponding to each picture, thus being favorable to show a video recovery effect to certain degree.

In some embodiments of the present application, the storage server or the processor 601 may transmit an access address corresponding to the pictures to a site server such that the site server embeds the access address into a webpage source code transmitted to the first user terminal. The first user terminal may obtain a plurality of pictures from the storage server based on the embedded picture access address in the webpage source code.

It is understandable that functions of respective functional modules of the screenshot server 600 may be specifically implemented according to the method according to the embodiments of the method, and a specific implementing process may refer to related description of the embodiments of the method and is not repeated herein.

Known from above, a technical solution of the present embodiment introduces the screenshot server 600, which obtains the video from the video server, captures a plurality of pictures from the video based on the preset screenshot strategy, and stores the pictures into the storage server, and the first user terminal obtains the webpage source code from the site server, and obtains the pictures from the storage server based on the picture access address embedded into the webpage source code. Since the screenshot server obtains the video from the video server, captures a plurality of pictures from the video and stores into the storage server, so that the user terminal may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

Figure 7:
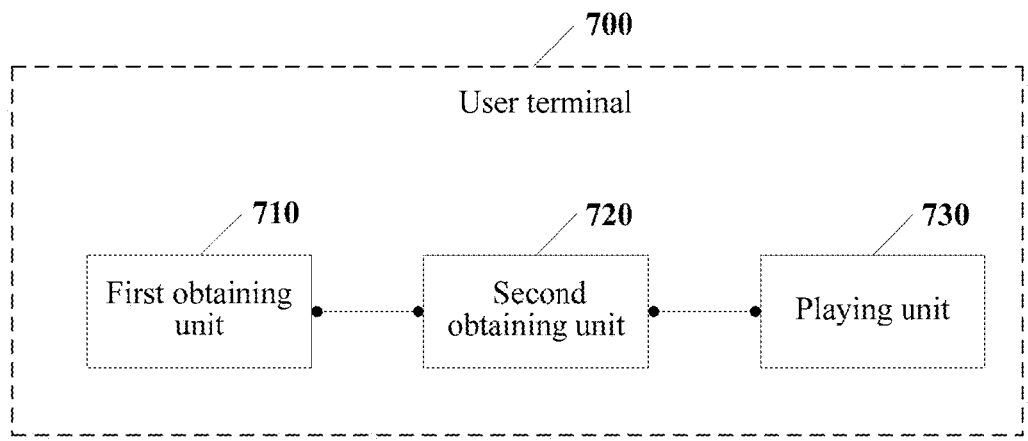
FIG. 7 is a schematic diagram of a user terminal according to an embodiment of the present application.

Referring to FIG. 7, an embodiment of the present application provides a user terminal 700, which may comprise:

a first obtaining unit 710, configured to obtain a webpage source code from a sire server;

a second obtaining unit 720, configured to obtain a plurality of pictures from a storage server based on an embedded picture access address in the webpage source code, the screenshot server from a video from a video server based on a preset screenshot strategy, each picture having associated playing order information; and a playing unit 730, configured to broadcast the pictures according to their associated playing order information.

In some embodiments of the present application, the second obtaining unit 720 is further configured to obtain a timestamp corresponding to each picture in the pictures from the storage server, the timestamp corresponding to each picture being used for indicating a time position of the picture in the video; and the playing unit 730 is specifically configured to broadcast the pictures based on a time sequence indicated by the timestamp corresponding to each picture.

In some embodiments of the present application, the second obtaining unit 720 is further configured to obtain a playing serial number corresponding to each picture in the pictures from the storage server, the playing serial number corresponding to each picture being matched with a position of the picture in the video; and the playing unit 730 is specifically configured to broadcast the pictures based on a playing sequence indicated by the playing serial number corresponding to each picture.

It is understandable that functions of respective functional modules of the user terminal 700 may be specifically implemented according to the method according to the embodiments of the method, and a specific implementing process may refer to related description of the embodiments of the method and is not repeated herein.

Known from above, a technical solution of the present embodiment introduces the screenshot server, which obtains the video from the video server, captures a plurality of pictures from the video based on the preset screenshot strategy, and stores the pictures into the storage server, and the user terminal 700 obtains the webpage source code from the site server, and obtains the pictures from the storage server based on the picture access address embedded into the webpage source code. Since the screenshot server obtains the video from the video server, captures a plurality of pictures from the video and stores into the storage server, so that the user terminal 700 may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

Referring to FIG. 8, which is a structural block diagram of a user terminal 800 according to another embodiment of the present application.

The screenshot server 800 may comprise: at least one processor 801, at least one network interface 804 or other user interfaces 803, a memory 805 and at least one communication bus 802. The communication bus 802 is configured to realizing connection communication among these components.

The screenshot server 800 may comprise a user interface 803, including a display (for example, a touch screen, an LCD, a CRT, Holographic or Projector), a knock device (for example, a mouse, a trackball, a touch panel or a touch screen), a camera and/or a pickup apparatus.

The memory 805 may include a read-only memory and a random access memory, and provides a command and data for the processor 801. A part of the memory 802 may further comprise a non-volatile random access memory (NVRAM).

In some embodiments, the memory 805 stores following elements: an executable module or data structure, or subsets thereof or supersets thereof.

An operation system 8051 includes various system programs, and is configured to realize various basic services and process hardware-based tasks.

An application program module 8052 contains various system programs and is configured to realize various application services.

The application program module 8052 includes but is not limited to a first obtaining unit 710, a second obtaining unit 720, and/or a playing unit 730.

In the embodiments of the present application, by calling a program or command stored in the memory 805, the processor 801 obtains a video from a video server captures a plurality of pictures from the video based on a preset screenshot strategy, and stores the pictures into a storage server such that a first user terminal obtains the pictures from the storage server to play.

In some embodiments of the present application, the preset screenshot strategy may be to capture a plurality of pictures from the video according to a certain capturing frequency, or capture a plurality of pictures from the video according to multiple set capturing time points, and of course the preset screenshot strategy can be specifically set according to actual scene demands.

In some embodiments of the present application, the processor 801 may generate a timestamp corresponding to each picture in the pictures and store the timestamp corresponding to each picture into the storage server such that after the first user terminal obtains the pictures and the timestamp corresponding to each picture in the pictures from the storage server, playing the pictures based on a time sequence indicated by the timestamp corresponding to each picture, wherein the timestamp corresponds to each picture being used for indicating a time position of the picture in the video.

In some embodiments of the present application, the operation of playing the pictures based on a time sequence indicated by the timestamp corresponding to each picture includes: broadcasting the pictures based on a time sequence indicated by the timestamp corresponding to each picture. It is understandable that the first user terminal broadcasts the pictures based on a time sequence indicated by the timestamp corresponding to each picture, thus being favorable to show a video recovery effect to certain degree.

In some embodiments of the present application, the processor 801 may generate a playing serial number corresponding to each picture in the pictures, and stores the playing serial number corresponding to each picture into the storage server such that after the first user terminal obtains the pictures and the playing serial number corresponding to each picture in the pictures from the storage server, playing the pictures based on a playing sequence indicated by the playing serial number corresponding to each picture, wherein the playing serial number corresponds to each picture being matched with a position of the picture in the video.

In some embodiments of the present application, the operation of playing the pictures based on a playing sequence indicated by the playing serial number corresponding to each picture includes: broadcasting the pictures based on a time sequence indicated by the timestamp corresponding to each picture. It is understandable that the first user terminal broadcasts the pictures based on a playing sequence indicated by the playing serial number corresponding to each picture, thus being favorable to show a video recovery effect to certain degree.

In some embodiments of the present application, the storage server or the processor 801 may transmit an access address corresponding to the pictures to a site server such that the site server embeds the access address into a webpage source code transmitted to the first user terminal. The first user terminal may obtain a plurality of pictures from the storage server based on the embedded picture access address in the webpage source code.

It is understandable that functions of respective functional modules of the user terminal 800 may be specifically implemented according to the method according to the embodiments of the method, and a specific implementing process may refer to related description of the embodiments of the method and is not repeated herein.

Known from above, a technical solution of the present embodiment introduces the screenshot server, which obtains the video from the video server, captures a plurality of pictures from the video based on the preset screenshot strategy, and stores the pictures into the storage server, and the user terminal 800 obtains the webpage source code from the site server, and obtains the pictures from the storage server based on the picture access address embedded into the webpage source code. Since the screenshot server obtains the video from the video server, captures a plurality of pictures from the video and stores into the storage server, so that the user terminal 800 may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

Referring to FIG. 9-a, an embodiment of the present application provides a video server 900, which may comprise:

a receiving unit 910, a querying unit 920 and a write-in unit 930.

The receiving unit 910 is configured to receive first video data.

For example, when a certain user terminal (called as a second user terminal for the purpose of quote) establishes connection with a video server, the second user terminal may upload a video (for example a live broadcasting video) to the video server, which receives the video uploaded by the second user terminal, wherein the second user terminal transmitting the video belongs to a certain user (called as a second user).

The user terminal denoted in each embodiment of the present application may be a personal computer, a cellphone, a personal digital processing device, or other types of user terminals.

The querying unit 920 is configured to query whether a record used for identifying a mapping relation between the second user and a video channel is stored in a mapping record storage region based on multiple hash algorithms, wherein the first video belongs to the second user.

In some embodiments of the present application, before receiving a first video from the second user terminal, the video sever 900 has allocated the video channel to the second user or not (the video server 900 may never allocate the video channel to the second user before, or reallocates the video channel allocated to the second user before to other users, or resets the video channel allocated to the second user before to an idle video channel, wherein the idle video channel does not belong to any user).

The video channel is a storage resource (for example a memory resource) used for storing the video in the video server 900, and a timestamp (the timestamp is used for recording the latest use time of the video channel) may be recorded in the video channel and information such as a user identifier of the user belonging to the video channel may also be recorded in the video channel.

The write-in unit 930 is configured to allocate a first video channel in an idle state at current to the second user, and write the first video into the first video channel if the querying unit 920 queries that no record used for identifying a mapping relation between the second user and the video channel is stored in above mapping record storage region.

In some embodiments of the present application, the write-in unit 930 may further identify that the first video channel belongs to the second user in the first video channel (for example, may writes the user identifier of the second user into the first video channel).

Referring to FIG. 9-b, in some embodiments of the present application, the video server 900 may further comprise:

a record maintaining unit 940, configured to generate a first record used for identifying a mapping relation between the second user and the first video channel, calculate to obtain a first storage address based on the multiple hash algorithms, and write the first record into a first storage space directed by the first storage address, wherein the first storage space belongs to the mapping record storage region.

In some embodiments of the present application, the write-in unit 930 is further configured to write the first video into the second video channel if the querying unit 920 queries that the record used for identifying a mapping relation between the second user and the video channel is stored in the mapping record storage region.

In some embodiments of the present application, the write-in unit 930 may further identify that the second video channel belongs to the second user in the second video channel (for example, may writes the user identifier of the second user into the second video channel).

Referring to FIG. 9-c, in some embodiments of the present application, the video server may further comprise: a timestamp updating unit 950, configured to update a timestamp of the first video channel if the write-in unit 930 writes the first video into the first video channel or update a timestamp of the second video channel if the write-in unit 930 writes the first video In some embodiments of the present application, In some embodiments of the present application, into the second video channel.

In some embodiments of the present application, on an aspect of allocating the first video channel in an idle state at current to the second user, the write-in unit 930 is specifically configured to allocate a first video channel in an idle state at current to the second user based on an idle chain table, wherein video channel identifiers corresponding to a plurality of video channels including the first video channel in an idle state at current are stored in the idle chain table, and the video channel identifier of the first video channel is recorded at a head or tail or any position in the idle chain table.

In some embodiments of the present application, input of above multiple hash algorithms is for example a user code of the second user (wherein the user code is a plurality of numbers), and the user code of the second user is the user identifier of the second user or obtained by converting the user identifier of the second user.

In some embodiments of the present application, K≥N*M*P, wherein K is the size of the total storage space of the mapping record storage region, M is a total number of the video channels capable of being provided by the video server, and P is the size of the storage space occupied storing one record used for identifying a mapping relation between the second user and the video channel, N is a positive integer, and for example, N may be 1, 2, 3, 4, 5, 6 or other values.

For instance, P is equal to 10 bytes, M is equal to 100, and N is equal to 6, then K may be larger than or equal to 6000 bytes. Since an addressing space of the mapping record region is larger than or equal to a storage space occupied by all video channels capable of being provided by the video server, it is favorable to allocate the video channels capable of being provided by the video server as fully as possible, and to improve a use rate of the video channels.

For example, the mapping record storage region may comprise at least N mapping record sub-storage regions, a storage space of each mapping record sub-storage region is larger than or equal to M*P, wherein M is a total number of the video channels capable of being provided by the video server, and P is the size of the storage space occupied storing one record used for identifying a mapping relation between the second user and the video channel. In such a scene, each hash algorithm in the multiple hash algorithms corresponds to a different mapping record sub-record region, a denominator of each hash algorithm is different and may be a prime number smaller than M.

In some embodiments of the present application, the video server 300 may further comprise a channel managing unit, configured to reset part or all currently overtime video channels to be idle video channels when set channel reset conditions are met. In some embodiments of the present application, the overtime video channels refer to that lag of time indicated by the timestamp corresponding to such video channel relative to current time exceeds a first duration threshold value, wherein the duration threshold value may be, for example, one second, two seconds, three seconds, or other durations set according to actual demands. The overtime video channels belong to a certain user. For example, when it is detected that the first video channel or the second video channel is overtime, the video sever resets the first video channel or the second video channel to be the idle video channel and may record the video channel identifier of the first video channel or the second video channel reset to be idle on a head or tail or any position in above idle chain table. Further, if resetting the first video channel or the second video channel to the idle video channels, the video server may further delete a record used for identifying a mapping relation between the first user and the second video channel stored in above mapping record storage region.

In some embodiments of the present application, the channel reset conditions may be various feasible conditions set according to actual scene demands. For example, the channel reset conditions may comprise at least one of following conditions: the quantity of the currently idle video channels is less than a set first threshold value (for example 10 or other values), a ratio of the quantity of the currently idle video channels to the total channel quantity is less than a set second threshold value (for example 15% or other values), an overtime video channel reset command is received, the quantity of the currently idle video channels is larger than a set third threshold value (for example 20 or other values), a set reset period (for example, one minute, two minutes or other values) is up, a ratio of the quantity of the currently idle video channels to the total channel quantity is larger than a set fourth threshold value (for example 50% or other values), and a ratio of the quantity of the currently idle video channels to the quantity of the currently idle video channels is larger than a set fifth threshold value (for example 1 or other values).

Values of respective threshold values (for example, the first threshold value, second threshold value, third threshold value, fourth threshold value and fifth threshold value) of the embodiments of the present application may be set according to specific scene demands as long as meeting actual demands.

It is understandable that when the set channel reset conditions are met, resetting part or all currently overtime video channels to be idle video channels, based on such a mechanism, the video server can obtain the idle video channels in batch, thus providing a foundation for subsequently improving use efficiency of the video channels.

In some embodiments of the present application, the when the set channel reset conditions are met, resetting part or all currently overtime video channels to be idle video channels may include:

resetting part or all currently overtime video channels to be idle video channels when the quantity of the currently idle video channels is less than a set first threshold value, or resetting part or all currently overtime video channels to be idle video channels when a ratio of the quantity of the currently idle video channels to the total channel quantity is less than a set second threshold value, or resetting part or all currently overtime video channels to be idle video channels when an overtime video channel reset command is received, or resetting part or all currently overtime video channels to be idle video channels when a set reset period is up, or resetting part or all currently overtime video channels to be idle video channels when the quantity of the currently idle video channels is larger than a set third threshold value, or resetting part or all currently overtime video channels to be idle video channels when a ratio of the quantity of the currently idle video channels to the total channel quantity is larger than a set fourth threshold value, or resetting part or all currently overtime video channels to be idle video channels when a ratio of the quantity of the currently idle video channels to the quantity of the currently idle video channels is larger than a set fifth threshold value.

It is understandable that functions of respective functional modules of the video server 900 may be specifically implemented according to the method according to the embodiments of the method, and a specific implementing process may refer to related description of the embodiments of the method and is not repeated herein.

It can be seen that in the embodiments of the present application, after the video server receives the first video data, whether a record used for identifying a mapping relation between a first user and a video channel is stored in a mapping record storage region is queried based on multiple hash algorithms, wherein the first video data belongs to the first user; and if it is queried that a record used for identifying a mapping relation between a first user and a video channel is not stored in a mapping record storage region, a first video channel in an idle state at current is allocated to the first user, and the first video data is written into the first video channel. Since the video server may specifically develop the mapping record storage region to store the record used for identifying a mapping relation between the user and the video channel, and queries whether a record used for identifying a mapping relation between the second user and the video channel is stored in the mapping record storage region based on multiple hash algorithms, indexing efficiency of the user video channel is greatly improved due to such a technology indexing the video channels of the user.

Figure 10:
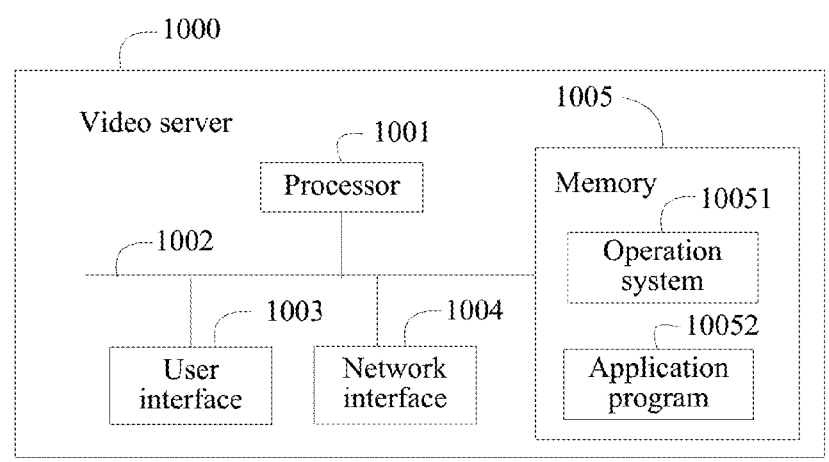
FIG. 10 is a schematic diagram of another video server according to an embodiment of the present application.

Referring to FIG. 10, which is a structural block diagram of a video server 1000 according to another embodiment of the present application, wherein the video sever 1000 may comprise: at least one processor 1001, at least one network interface 1004 or other user interfaces 1003, a memory 1005 and at least one communication bus 1002. The communication bus 1002 is configured to realizing connection communication among these components. The screenshot server 1000 may comprise a user interface 1003, including a display (for example, a touch screen, an LCD, a CRT, Holographic or Projector), a knock device (for example, a mouse, a trackball, a touch panel or a touch screen), a camera and/or a pickup apparatus.

The memory 1002 may include a read-only memory and a random access memory, and provides a command and data for the processor 1001. A part of the memory 1002 may further comprise a non-volatile random access memory (NVRAM).

In some embodiments, the memory 1005 stores following elements: an executable module or data structure, or subsets thereof or supersets thereof.

An operation system 10051 includes various system programs, and is configured to realize various basic services and process hardware-based tasks.

An application program module 10052 contains various system programs and is configured to realize various application services.

The application program module 10052 includes but is not limited to a receiving unit 910, a querying unit 920, a write-in unit 930, a record maintaining unit 940 and/or a timestamp updating unit 950.

In the embodiment of the present application, by calling a program or command stored in the memory 1005, the processor 1001 is configured to receives a first video; query whether a record used for identifying a mapping relation between a second user and a video channel is stored in a mapping record storage region based on multiple hash algorithms, the first video data belonging to the first user; and allocate a first video channel in an idle state at current to the first user, and write the first video data into the first video channel if querying that a record used for identifying a mapping relation between the second user and the video channel is not stored in a mapping record storage region.

For example, when a certain user terminal (called as a second user terminal for the purpose of quote) establishes connection with a video server, the second user terminal may upload a video (called as the first video data for the purpose of quote) to the video server, which receives the video uploaded by the second user terminal, wherein the second user terminal transmitting the first video belongs to a certain user (called as a second user).

The user terminal denoted in each embodiment of the present application may be a personal computer, a cellphone, a personal digital processing device, or other types of user terminals.

A first video data pack may be a live broadcasting video data pack and of course may be other types of video data packs.

In some embodiments of the present application, before receiving the first data video, the processor 1001 allocates the video channel to the first user or not (the video server 1001 may never allocate the video channel to the first user before, or reallocates the video channel allocated to the first user before to other users, or resets the video channel allocated to the first user before to an idle video channel, wherein the idle video channel does not belong to any user).

The video channel is a storage resource (for example a memory resource) used for storing the video in the video server, and a timestamp (the timestamp is used for recording the latest use time of the video channel) may be recorded in the video channel and information such as a user identifier of the user belonging to the video channel may also be recorded in the video channel.

If the processor 1001 queries that no record used for identifying a mapping relation between the second user and the video channel is stored in above mapping record storage region, it is indicated that the processor 1001 possibly allocates no video channel to the second user at current.

In some embodiments of the present application, "the processor 1001 allocates a first video channel in an idle state at current to the first user" may include: allocating a first video channel in an idle state at current to the first user based on an idle chain table, wherein video channel identifiers corresponding to a plurality of video channels including the first video channel in an idle state at current are stored in the idle chain table, and the video channel identifier of the first video channel is recorded at a head or tail or any position in the idle chain table.

In some embodiments of the present application, the processor 1001 may further identify that the first video channel belongs to the second user in the first video channel (for example, may writes the user identifier of the second user into the first video channel).

In some embodiments of the present application, the processor 1001 may further generate a first record used for identifying a mapping relation between the first user and the video channel, calculates to obtain a first storage address based on the multiple hash algorithms, and writes the first record into a first storage space directed by the first storage address, wherein the first storage space belongs to above mapping record storage region.

In some embodiments of the present application, when writing the first video data into the first video channel, the processor 1001 may further update a timestamp of the first video channel, it is understandable that time indicated by the timestamp of the first video channel updated by the video server may be the time of writing the first video data into the first video channel.

In some embodiments of the present application, input of above multiple hash algorithms is for example a user code of the second user (wherein the user code is a plurality of numbers), and the user code of the second user is the user identifier of the second user or obtained by converting the user identifier of the second user.

In some embodiments of the present application, $K \geq N*M*P$, wherein K is the size of the total storage space of the mapping record storage region, M is a total number of the video channels capable of being provided by the video server, and P is the size of the storage space occupied storing one record used for identifying a mapping relation between the second user and the video channel, N is a positive integer, and for example, N may be 1, 2, 3, 4, 5, 6 or other values.

For instance, P is equal to 10 bytes, M is equal to 100, and N is equal to 6, then K may be larger than or equal to 6000 bytes. Since an addressing space of the mapping record region is larger than or equal to a storage space occupied by all video channels capable of being provided by the video server, it is favorable to allocate the video channels capable of being provided by the video server as fully as possible, and to improve a use rate of the video channels.

For example, the mapping record storage region may comprise at least N mapping record sub-storage regions, a storage space of each mapping record sub-storage region is larger than or equal to $M*P$, wherein M is a total number of the video channels capable of being provided by the video server, and P is the size of the storage space occupied storing one record used for identifying a mapping relation between the second user and the video channel. In such a scene, each hash algorithm in the multiple hash algorithms corresponds to a different mapping record sub-record region, a denominator of each hash algorithm is different and may be a prime number smaller than M.

In some embodiments of the present application, if querying a second record used for indicating a mapping relation between the first user and a second video channel, the processor 1001 writes the first video data into the second video channel. In addition, the video server may further identify that the second video channel belongs to the second user in the second video channel (for example, may writes the user identifier of the second user into the second video channel).

If the processor 1001 queries that the second record used for identifying a mapping relation between the second user and the second video channel is stored in above mapping record storage region, it is indicated that the processor 1001 has allocated the second video channel to the first user before.

In some embodiments of the present application, when meeting set channel reset conditions, the processor 1001 may further reset part or all currently overtime video channels to be idle video channels. In some embodiments of the present application, the overtime video channels refer to that lag of time indicated by the timestamp corresponding to such video channel relative to current time exceeds a first duration threshold value, wherein the duration threshold value may be, for example, one second, two seconds, three seconds, or other durations set according to actual demands. The overtime video channels belong to a certain user. For example, when it is detected that the first video channel or the second video channel is overtime, the video sever resets the first video channel or the second video channel to be the idle video channel and may record the video channel identifier of the first video channel or the second video channel reset to be idle on a head or tail or any position in above idle chain table. Further, if resetting the first video channel or the second video channel to the idle video channels, the video server may further delete a record used for identifying a mapping relation between the first user and the second video channel stored in above mapping record storage region.

In some embodiments of the present application, the channel reset conditions may be various feasible conditions set according to actual scene demands. For example, the channel reset conditions may comprise at least one of following conditions: the quantity of the currently idle video channels is less than a set first threshold value (for example 10 or other values), a ratio of the quantity of the currently idle video channels to the total channel quantity is less than a set second threshold value (for example 15% or other values), an overtime video channel reset command is received, the quantity of the currently idle video channels is larger than a set third threshold value (for example 20 or other values), a set reset period (for example, one minute, two minutes or other values) is up, a ratio of the quantity of the currently idle video channels to the total channel quantity is larger than a set fourth threshold value (for example 50% or other values), and a ratio of the quantity of the currently idle video channels to the quantity of the currently idle video channels is larger than a set fifth threshold value (for example 1 or other values).

Values of respective threshold values (for example, the first threshold value, second threshold value, third threshold value, fourth threshold value and fifth threshold value) of the embodiments of the present application may be set according to specific scene demands as long as meeting actual demands.

It is understandable that when the set channel reset conditions are met, resetting part or all currently overtime video channels to be idle video channels, based on such a mechanism, the video server can obtain the idle video channels in batch, thus providing a foundation for subsequently improving use efficiency of the video channels.

In some embodiments of the present application, the when the set channel reset conditions are met, resetting part or all currently overtime video channels to be idle video channels may include:

resetting part or all currently overtime video channels to be idle video channels when the quantity of the currently idle video channels is less than a set first threshold value, or resetting part or all currently overtime video channels to be idle video channels when a ratio of the quantity of the currently idle video channels to the total channel quantity is less than a set second threshold value, or resetting part or all currently overtime video channels to be idle video channels when an overtime video channel reset command is received, or resetting part or all currently overtime video channels to be idle video channels when a set reset period is up, or resetting part or all currently overtime video channels to be idle video channels when the quantity of the currently idle video channels is larger than a set third threshold value, or resetting part or all currently overtime video channels to be idle video channels when a ratio of the quantity of the currently idle video channels to the total channel quantity is larger than a set fourth threshold value, or resetting part or all currently overtime video channels to be idle video channels when a ratio of the quantity of the currently idle video channels to the quantity of the currently idle video channels is larger than a set fifth threshold value.

In order to better understand a video channel managing mechanism of the video server 1000, a more specific application scene is taken as an example for further description.

Assuming that the video server 1000 may provide 1000 video channels. The mapping record storage region may comprise at least 6 mapping record sub-storage regions (that is the mapping record sub-storage regions s1-s6), and a space size of each mapping record sub-storage region is larger than or equal to 1000*P, wherein the P is the size of the storage space occupied storing one record used for identifying a mapping relation between the second user and the video channel.

Assuming that the video server 1000 receives a video s1 from a user terminal a, wherein the video s1 carries a user identifier of the user A; based on multiple hash algorithms, the video server takes the user identifier of the user A as input of the multiple hash algorithms, and queries whether a record used for identifying a mapping relation between the user A and the video channel is stored in the mapping record storage region.

Assuming that the hash algorithms are modular operation, the user identifier of the use A is 100000000, if a denominator of the hash algorithm is 997 (prime number), then a calculated result of the hash algorithm is 100000000%997=900. In some embodiments, if a maximal hash space is set to be 1000, a hash order is 6, and then a hash function denominator of each hash order may be different from other denominators of hash functions of other orders, and is smaller than the maximal prime number of the hash space size. For example, the hash function denominator of the six order hash may be 997, 991, 983, 977, 971 and 967 respectively.

Assuming that the user identifier is 100000000, then a specific manner of querying, by the processor 1000, whether a record used for identifying a mapping relation between the user A and the video channel is stored in the mapping record storage region may include:

Step a, 100000000%997=900, obtaining a video channel identifier in the record if the record used for identifying a mapping relation between the user A and the video channel is stored in a storage space corresponding to a storage address 900 in a mapping record sub-storage region s1; and executing a step b if the record used for identifying a mapping relation between the user A and the video channel is not stored in a storage space corresponding to the storage address 900 in the mapping record sub-storage region s1.

Step b, 100000000%991=172, obtaining a video channel identifier in the record if the record used for identifying a mapping relation between the user A and the video channel is stored in a storage space corresponding to a storage address 172 in a mapping record sub-storage region s2; and executing a step c if the record used for identifying a mapping relation between the user A and the video channel is not stored in a storage space corresponding to the storage address 172 in the mapping record sub-storage region s2.

Step c, 100000000%983=393, obtaining a video channel identifier in the record if the record used for identifying a mapping relation between the user A and the video channel is stored in a storage space corresponding to a storage address 393 in a mapping record sub-storage region s3; and executing a step d if the record used for identifying a mapping relation between the user A and the video channel is not stored in a storage space corresponding to the storage address 393 in the mapping record sub-storage region s3.

Step d, 100000000%977=142, obtaining a video channel identifier in the record if the record used for identifying a mapping relation between the user A and the video channel is stored in a storage space corresponding to a storage address 142 in a mapping record sub-storage region s4; and executing a step e if the record used for identifying a mapping relation between the user A and the video channel is not stored in a storage space corresponding to the storage address 142 in the mapping record sub-storage region s4.

Step e, 100000000%971=594, obtaining a video channel identifier in the record if the record used for identifying a mapping relation between the user A and the video channel is stored in a storage space corresponding to a storage address 594 in a mapping record sub-storage region s5; and executing a step f if the record used for identifying a mapping relation between the user A and the video channel is not stored in a storage space corresponding to the storage address 594 in the mapping record sub-storage region s5.

Step f, 100000000%967=596, obtaining a video channel identifier in the record if the record used for identifying a mapping relation between the user A and the video channel is stored in a storage space corresponding to a storage address 596 in a mapping record sub-storage region s6; and returning back to query a record failure command if the record used for identifying a mapping relation between the user A and the video channel is not stored in a storage space corresponding to the storage address 596 in the mapping record sub-storage region s6.

If querying that a record used for identifying a mapping relation between the user A and a second video channel is stored in a mapping record storage region, the processor 1001 writes the first video into the second video channel based on a video channel identifier in the second video channel in the record.

In addition, if querying that a record used for identifying a mapping relation between the user A and a second video channel is not stored in a mapping record storage region, based on an idle chain table, the processor 1001 allocates a first video channel in an idle state at current to the user A, writes the first video into the first video channel and updates a timestamp of the first video channel. Further, the processor 1001 generates a first record used for identifying a mapping relation between the first user and the first video channel, calculates to obtain a first storage address based on multiple hash algorithms, and writes the first record into the first storage space directed by the first storage address, wherein, the first storage space belongs to the mapping record storage region.

A manner, by the processor 1001, of obtaining the first storage address based on the multiple hash algorithms is similar to the manner of looking up that whether a record used for identifying a mapping relation between the user A and the video channel is stored in the mapping record storage region.

Assuming that the user identifier is 100000000, then a specific manner of obtaining the first storage address based on the multiple hash algorithms may comprise:

Step a2, 100000000%997=900, the first storage address being a storage address 900 if a storage space corresponding to the storage address 900 in a mapping record sub-storage region s1 is not occupied; and executing a step b2 if a storage space corresponding to the storage address 900 in the mapping record sub-storage region s1 is occupied.

Step b2, 100000000%991=172, the first storage address being a storage address 172 if a storage space corresponding to the storage address 172 in a mapping record sub-storage region s2 is not occupied; and executing a step c2 if a storage space corresponding to the storage address 172 in the mapping record sub-storage region s2 is occupied.

Step c2, 100000000%983=393, the first storage address being a storage address 393 if a storage space corresponding to the storage address 393 in a mapping record sub-storage region s3 is not occupied; and executing a step d2 if a storage space corresponding to the storage address 393 in the mapping record sub-storage region s3 is occupied.

Step d2, 100000000%977=142, the first storage address being a storage address 172 if a storage space corresponding to the storage address 142 in a mapping record sub-storage region s4 is not occupied; and executing a step e2 if a storage space corresponding to the storage address 142 in the mapping record sub-storage region s4 is occupied.

Step e2, 100000000%971=594, the first storage address being a storage address 594 if a storage space corresponding to the storage address 594 in a mapping record sub-storage region s5 is not occupied; and executing a step f2 if a storage space corresponding to the storage address 594 in the mapping record sub-storage region s5 is occupied.

Step f2, 100000000%967=596, the first storage address being a storage address 596 if a storage space corresponding to the storage address 596 in a mapping record sub-storage region s6 is not occupied; and returning back to an address allocating failure command if a storage space corresponding to the storage address 596 in the mapping record sub-storage region s6 is occupied.

It is understandable that the hash algorithms in the examples are one of executable hash algorithms, and the processor 1001 may select other hash algorithms in actual application and are not repeated one by one herein.

It is understandable that functions of respective functional modules of the video server 1000 may be specifically implemented according to the method according to the embodiments of the method, and a specific implementing process may refer to related description of the embodiments of the method and is not repeated herein.

It can be seen that after the video server 1000 in the present embodiment receives the first video data, whether a record used for identifying a mapping relation between a first user and a video channel is stored in a mapping record storage region is queried based on multiple hash algorithms, wherein the first video belongs to the second user; and if it is queried that a record used for identifying a mapping relation between the second user and the video channel is not stored in a mapping record storage region, a first video channel in an idle state at current is allocated to the second user, and the first video data is written into the first video channel. Since the video server may specifically develop the mapping record storage region to store the record used for identifying a mapping relation between the user and the video channel, and queries whether a record used for identifying a mapping relation between the second user and the video channel is stored in the mapping record storage region based on multiple hash algorithms, indexing efficiency of the user video channel is greatly improved due to such a technology indexing the video channels of the user.

Figure 11:
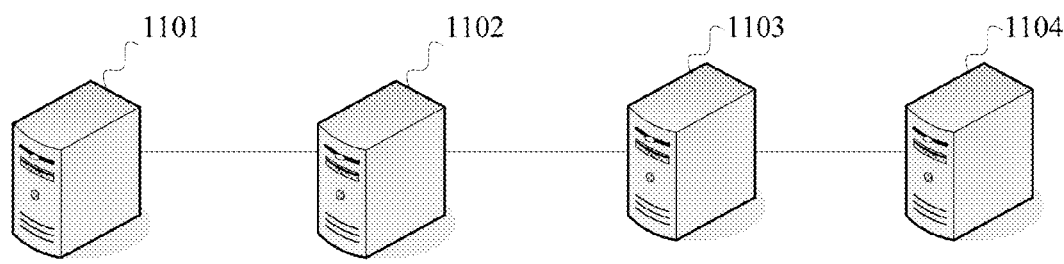
FIG. 11 is a schematic diagram of a video system according to an embodiment of the present application.

Referring to FIG. 11, an embodiment of the present application further provides a communication system, comprising:

a video server 1101, a screenshot server 1102, a storage server 1103 and a site server 1104.

The video server 1101 is configured to receive a video uploaded by a second user terminal.

The screenshot server 1102 is configured to obtain a video uploaded by the second user terminal from the video server, obtain a plurality of pictures from the video based on a preset screenshot strategy and store the pictures into the storage server.

The storage server 1103 is configured to transmit an access address corresponding to the pictures to the site server.

The site server 1104 is configured to embed the access address into a webpage source code transmitted to the first user terminal such that the first user terminal obtains the pictures from the storage server to play.

In some embodiments of the present application, the video server 1101 may be specifically configured to receive a live broadcasting video uploaded by the second user terminal or videos of other types.

In some embodiments of the present application, after receiving the video from the second user terminal, the video server 1101, based on multiple hash algorithms, queries whether a record used for identifying a mapping relation between the second user and a video channel is stored in a mapping record storage region thereof.

In some embodiments of the present application, before receiving a first video from the second user terminal, the video sever 1101 has allocated the video channel to the second user or not (the video server 1101 may never allocate the video channel to the second user before, or reallocates the video channel allocated to the second user before to other users, or resets the video channel allocated to the second user before to an idle video channel, wherein the idle video channel does not belong to any user). The video channel is a storage resource (for example a memory resource) used for storing the video in the video server 1101, and a timestamp (the timestamp is used for recording the latest use time of the video channel) may be recorded in the video channel and information such as a user identifier of the user belonging to the video channel may also be recorded in the video channel.

If querying that no record used for identifying a mapping relation between the second user and the video channel is stored in above mapping record storage region, the video server 1101 allocates a first video channel in an idle state at current to the second user, and writes the first video into the first video channel.

If the video sever queries that no record used for identifying a mapping relation between the second user and the video channel is stored in above mapping record storage region, it is indicated that the video server 1101 possibly allocates no video channel to the second user at current.

In some embodiments of the present application, the allocating a first video channel in an idle state at current to the second user may include: allocating a first video channel in an idle state at current to the second user based on an idle chain table, wherein video channel identifiers corresponding to a plurality of video channels including the first video channel in an idle state at current are stored in the idle chain table, and the video channel identifier of the first video channel is recorded at a head or tail or any position in the idle chain table.

In some embodiments of the present application, the video server 1101 may further identify that the first video channel belongs to the second user in the first video channel (for example, may writes the user identifier of the second user into the first video channel).

In some embodiments of the present application, the video server 1101 may further generate a first record used for identifying a mapping relation between the second user and the video channel, calculates to obtain a first storage address based on the multiple hash algorithms, and writes the first record into a first storage space directed by the first storage address, wherein the first storage space belongs to above mapping record storage region.

In some embodiments of the present application, when writing the first video into the first video channel, the video server 1101 may further update a timestamp of the first video channel, it is understandable that time indicated by the timestamp of the first video channel updated by the video server 1101 may be the time of writing the first video into the first video channel.

In some embodiments of the present application, input of above multiple hash algorithms is for example a user code of the second user (wherein the user code is a plurality of numbers), and the user code of the second user is the user identifier of the second user or obtained by converting the user identifier of the second user.

In some embodiments of the present application, K≥N*M*P, wherein K is the size of the total storage space of the mapping record storage region, M is a total number of the video channels capable of being provided by the video server 1101, and P is the size of the storage space occupied storing one record used for identifying a mapping relation between the second user and the video channel, N is a positive integer, and for example, N may be 1, 2, 3, 4, 5, 6 or other values.

For instance, P is equal to 10 bytes, M is equal to 100, and N is equal to 6, then K may be larger than or equal to 6000 bytes. Since an addressing space of the mapping record region is larger than or equal to a storage space occupied by all video channels capable of being provided by the video server 1101, it is favorable to allocate the video channels capable of being provided by the video server 1101 as fully as possible, and to improve a use rate of the video channels.

For example, the mapping record storage region may comprise at least N mapping record sub-storage regions, a storage space of each mapping record sub-storage region is larger than or equal to M*P, wherein M is a total number of the video channels capable of being provided by the video server 1101, and P is the size of the storage space occupied storing one record used for identifying a mapping relation between the second user and the video channel. In such a scene, each hash algorithm in the multiple hash algorithms corresponds to a different mapping record sub-record region, a denominator of each hash algorithm is different and may be a prime number smaller than M.

In some embodiments of the present application, the video server 1101 is further configured to write the first video into the second video channel if querying that a second record used for indicating a mapping relation between the second user and a second video channel exists in the mapping record storage region. In addition, the video server 1101 may further identify that the second video channel belongs to the second user in the second video channel (for example, may writes the user identifier of the second user into the second video channel).

If the video sever queries that the second record used for identifying a mapping relation between the second user and the second video channel is stored in above mapping record storage region, it is indicated that the video server 1101 has allocated the second video channel to the second user before.

In some embodiments of the present application, when meeting set channel reset conditions, the video server 1101 may further reset part or all currently overtime video channels to be idle video channels. In some embodiments of the present application, the overtime video channels refer to that lag of time indicated by the timestamp corresponding to such video channel relative to current time exceeds a first duration threshold value, wherein the duration threshold value may be, for example, one second, two seconds, three seconds, or other durations set according to actual demands. The overtime video channels belong to a certain user. For example, when it is detected that the first video channel or the second video channel is overtime, the video sever 1101 resets the first video channel or the second video channel to be the idle video channel and may record the video channel identifier of the first video channel or the second video channel reset to be idle on a head or tail or any position in above idle chain table. Further, if resetting the first video channel or the second video channel to the idle video channels, the video server 1101 may further delete a record used for identifying a mapping relation between the second user and the second video channel stored in above mapping record storage region.

In some embodiments of the present application, the channel reset conditions may be various feasible conditions set according to actual scene demands. For example, the channel reset conditions may comprise at least one of following conditions: the quantity of the currently idle video channels is less than a set first threshold value (for example 10 or other values), a ratio of the quantity of the currently idle video channels to the total channel quantity is less than a set second threshold value (for example 15% or other values), an overtime video channel reset command is received, the quantity of the currently idle video channels is larger than a set third threshold value (for example 20 or other values), a set reset period (for example, one minute, two minutes or other values) is up, a ratio of the quantity of the currently idle video channels to the total channel quantity is larger than a set fourth threshold value (for example 50% or other values), and a ratio of the quantity of the currently idle video channels to the quantity of the currently idle video channels is larger than a set fifth threshold value (for example 1 or other values).

Values of respective threshold values (for example, the first threshold value, second threshold value, third threshold value, fourth threshold value and fifth threshold value) of the embodiments of the present application may be set according to specific scene demands as long as meeting actual demands.

It can be seen that the video server 1101 may specifically develop the mapping record storage region to store the record used for identifying a mapping relation between the user and the video channel, and queries whether a record used for identifying a mapping relation between the second user and the video channel is stored in the mapping record storage region based on multiple hash algorithms, indexing efficiency of the user video channel is greatly improved due to such a technology indexing the video channels of the user.

Of course, the video server 1101 may cache the video uploaded by the second user in other manners.

In some embodiments of the present application, the preset screenshot strategy may be to capture a plurality of pictures from the video according to a certain capturing frequency, or capture a plurality of pictures from the video according to multiple set capturing time points, and of course the preset screenshot strategy can be specifically set according to actual scene demands.

In some embodiments of the present application, the screenshot server 1102 may generate a timestamp corresponding to each picture in the pictures and store the timestamp corresponding to each picture into the storage server 1103 such that after the first user terminal obtains the pictures and the timestamp corresponding to each picture in the pictures from the storage server 1103, playing the pictures based on a time sequence indicated by the timestamp corresponding to each picture, wherein the timestamp corresponds to each picture being used for indicating a time position of the picture in the video.

In some embodiments of the present application, the operation of playing the pictures based on a time sequence indicated by the timestamp corresponding to each picture includes: broadcasting the pictures based on a time sequence indicated by the timestamp corresponding to each picture. It is understandable that the first user terminal broadcasts the pictures based on a time sequence indicated by the timestamp corresponding to each picture, thus being favorable to show a video recovery effect to certain degree.

In some embodiments of the present application, the screenshot server 1102 may generate a playing serial number corresponding to each picture in the pictures, and stores the playing serial number corresponding to each picture into the storage server 1103 such that after the first user terminal obtains the pictures and the playing serial number corresponding to each picture in the pictures from the storage server 1103, playing the pictures based on a playing sequence indicated by the playing serial number corresponding to each picture, wherein the playing serial number corresponds to each picture being matched with a position of the picture in the video.

In some embodiments of the present application, the operation of playing the pictures based on a playing sequence indicated by the playing serial number corresponding to each picture includes: broadcasting the pictures based on a time sequence indicated by the timestamp corresponding to each picture. It is understandable that the first user terminal broadcasts the pictures based on a playing sequence indicated by the playing serial number corresponding to each picture, thus being favorable to show a video recovery effect to certain degree.

In some embodiments of the present application, the storage server 1103 or the screenshot server 1102 may transmit an access address corresponding to the pictures to the site server 1104 such that the site server 1104 embeds the access address into a webpage source code transmitted to the first user terminal. The first user terminal may obtain a plurality of pictures from the storage server 1103 based on the embedded picture access address in the webpage source code.

In order to better understand a video channel managing mechanism of the video server 1101, a more specific application scene is taken as an example for further description.

Assuming that the video server 1101 may provide 1000 video channels. The mapping record storage region may comprise at least 6 mapping record sub-storage regions (that is the mapping record sub-storage regions s1-s6), and a space size of each mapping record sub-storage region is larger than or equal to 1000*P, wherein the P is the size of the storage space occupied storing one record used for identifying a mapping relation between the second user and the video channel.

Assuming that the video server 1101 receives a video s1 from a user terminal a, wherein the video s1 carries a user identifier of the user A; based on multiple hash algorithms, the video server takes the user identifier of the user A as input of the multiple hash algorithms, and queries whether a record used for identifying a mapping relation between the user A and the video channel is stored in the mapping record storage region.

Assuming that the hash algorithms are modular operation, the user identifier of the use A is 100000000, if a denominator of the hash algorithm is 997 (prime number), then a calculated result of the hash algorithm is 100000000%997=900. In some embodiments, if a maximal hash space is set to be 1000, a hash order is 6, and then a hash function denominator of each hash order may be different from other denominators of hash functions of other orders, and is smaller than the maximal prime number of the hash space size. For example, the hash function denominator of the six order hash may be 997, 991, 983, 977, 971 and 967 respectively.

Assuming that the user identifier is 100000000, then a specific manner of querying, by the processor 1000, whether a record used for identifying a mapping relation between the user A and the video channel is stored in the mapping record storage region may include:

Step a, 100000000%997=900, obtaining a video channel identifier in the record if the record used for identifying a mapping relation between the user A and the video channel is stored in a storage space corresponding to a storage address 900 in a mapping record sub-storage region s1; and executing a step b if the record used for identifying a mapping relation between the user A and the video channel is not stored in a storage space corresponding to the storage address 900 in the mapping record sub-storage region s1.

Step b, 100000000%991=172, obtaining a video channel identifier in the record if the record used for identifying a mapping relation between the user A and the video channel is stored in a storage space corresponding to a storage address 172 in a mapping record sub-storage region s2; and executing a step c if the record used for identifying a mapping relation between the user A and the video channel is not stored in a storage space corresponding to the storage address 172 in the mapping record sub-storage region s2.

Step c, 100000000%983=393, obtaining a video channel identifier in the record if the record used for identifying a mapping relation between the user A and the video channel is stored in a storage space corresponding to a storage address 393 in a mapping record sub-storage region s3; and executing a step d if the record used for identifying a mapping relation between the user A and the video channel is not stored in a storage space corresponding to the storage address 393 in the mapping record sub-storage region s3.

Step d, 100000000%977=142, obtaining a video channel identifier in the record if the record used for identifying a mapping relation between the user A and the video channel is stored in a storage space corresponding to a storage address 142 in a mapping record sub-storage region s4; and executing a step e if the record used for identifying a mapping relation between the user A and the video channel is not stored in a storage space corresponding to the storage address 142 in the mapping record sub-storage region s4.

Step e, 100000000%971=594, obtaining a video channel identifier in the record if the record used for identifying a mapping relation between the user A and the video channel is stored in a storage space corresponding to a storage address 594 in a mapping record sub-storage region s5; and executing a step f if the record used for identifying a mapping relation between the user A and the video channel is not stored in a storage space corresponding to the storage address 594 in the mapping record sub-storage region s5.

Step f, 100000000%967=596, obtaining a video channel identifier in the record if the record used for identifying a mapping relation between the user A and the video channel is stored in a storage space corresponding to a storage address 596 in a mapping record sub-storage region s6; and returning back to query a record failure command if the record used for identifying a mapping relation between the user A and the video channel is not stored in a storage space corresponding to the storage address 596 in the mapping record sub-storage region s6.

If querying that a record used for identifying a mapping relation between the user A and a second video channel is stored in a mapping record storage region, the video server 1101 writes the first video into the second video channel based on a video channel identifier in the second video channel in the record.

In addition, if querying that a record used for identifying a mapping relation between the user A and a second video channel is not stored in a mapping record storage region, based on an idle chain table, the video server 1101 allocates a first video channel in an idle state at current to the user A, writes the first video into the first video channel and updates a timestamp of the first video channel. Further, the video server 1101 generates a first record used for identifying a mapping relation between the first user and the first video channel, calculates to obtain a first storage address based on multiple hash algorithms, and writes the first record into the first storage space directed by the first storage address, wherein, the first storage space belongs to the mapping record storage region.

A manner of obtaining the first storage address based on the multiple hash algorithms is similar to the manner of looking up that whether a record used for identifying a mapping relation between the user A and the video channel is stored in the mapping record storage region.

Assuming that the user identifier is 100000000, then a specific manner of obtaining the first storage address based on the multiple hash algorithms may comprise:

Step a2, 100000000%997=900, the first storage address being a storage address 900 if a storage space corresponding to the storage address 900 in a mapping record sub-storage region s1 is not occupied; and executing a step b2 if a storage space corresponding to the storage address 900 in the mapping record sub-storage region s1 is occupied.

Step b2, 100000000%991=172, the first storage address being a storage address 172 if a storage space corresponding to the storage address 172 in a mapping record sub-storage region s2 is not occupied; and executing a step c2 if a storage space corresponding to the storage address 172 in the mapping record sub-storage region s2 is occupied.

Step c2, 100000000%983=393, the first storage address being a storage address 393 if a storage space corresponding to the storage address 393 in a mapping record sub-storage region s3 is not occupied; and executing a step d2 if a storage space corresponding to the storage address 393 in the mapping record sub-storage region s3 is occupied.

Step d2, 100000000%977=142, the first storage address being a storage address 172 if a storage space corresponding to the storage address 142 in a mapping record sub-storage region s4 is not occupied; and executing a step e2 if a storage space corresponding to the storage address 142 in the mapping record sub-storage region s4 is occupied.

Step e2, 100000000%971=594, the first storage address being a storage address 594 if a storage space corresponding to the storage address 594 in a mapping record sub-storage region s5 is not occupied; and executing a step f2 if a storage space corresponding to the storage address 594 in the mapping record sub-storage region s5 is occupied.

Step f2, 100000000%967=596, the first storage address being a storage address 596 if a storage space corresponding to the storage address 596 in a mapping record sub-storage region s6 is not occupied; and returning back to an address allocating failure command if a storage space corresponding to the storage address 596 in the mapping record sub-storage region s6 is occupied.

It is understandable that the hash algorithms in the examples are one of executable hash algorithms, and the video server 1101 may select other hash algorithms in actual application and are not repeated one by one herein.

It is understandable that the video server 1101 in the present embodiment may be any video sever in above embodiments, the screenshot server 1102 in the present embodiment may be any screenshot server in above embodiments, the storage server 1103 in the present embodiment may be any storage sever in above embodiments, the site server 1104 in the present embodiment may be any site sever in above embodiments, functions of each network device are specifically specified according to the method in the embodiments, and a specific implementing process may refer to related description of the embodiments of the method and is not repeated herein.

Known from above, technical solutions of some embodiments of the present application introduce a screenshot server 1102, which obtains a video from a video server 1101, captures a plurality of pictures from the video based on a present screenshot strategy and stores the pictures into the storage server 1103 such that a first user terminal obtains the pictures from the storage server 1103 to play. Since the screenshot server 1102 obtains the video from the video server 1101, captures a plurality of pictures from the video and stores into the storage server 1103, so that the user terminal may obtain the pictures from the storage server 1103 to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server 1102 is employed to directly obtain the video from the video server 1101 for screenshot, the user terminal of a video source is not required for screenshot and uploading, and it is favorable to reduce a handling capacity of the user terminal of the video source, and reduce occupation of the video source on a bandwidth of the user terminal.

It is understandable that the screenshot server and the storage server in the embodiments of the prevention may be integrated on one physical entity, or the storage server and the site server in the embodiments of the prevention may be integrated on one physical entity, or the screenshot server, the storage server and the site server in the embodiments of the prevention may be integrated on one physical entity.

Figure 12:
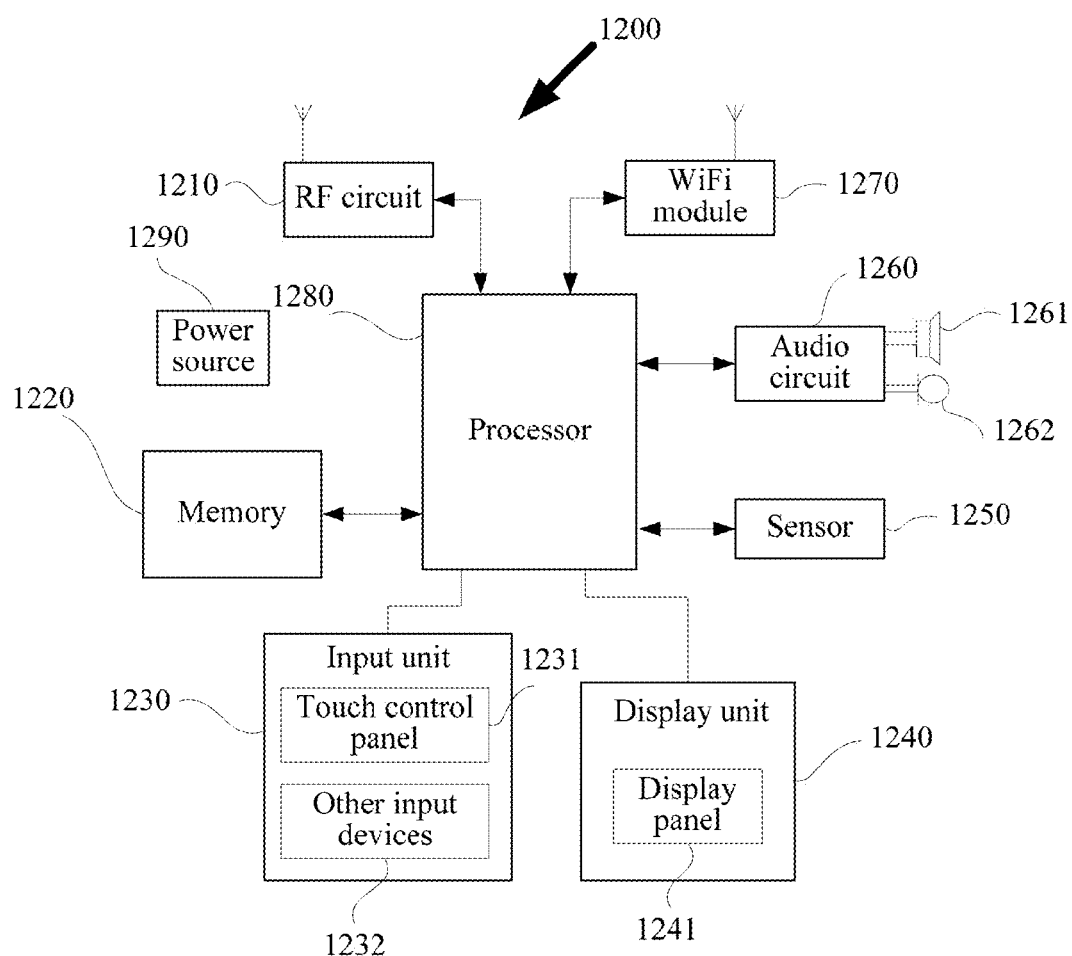
FIG. 12 is a schematic diagram of a user terminal according to an embodiment of the present application.

For the purpose of description, FIG. 12 merely illustrates associated parts of an embodiment of the present application, and undisclosed specific technical details refer to the portions of the method embodiments of the present application. A user terminal 1200 as shown in FIG. 12 may be any terminal device such as a cellphone, a table computer, a personal digital assistant (PDA), a point of sales (POS) and a vehicle-mounted computer, and the user terminal 1200 being is mainly taken as an example for description:

FIG. 12 illustrates a block diagram of a part of structure of a cellphone associated with the terminal according to the embodiments of the present application. Referring to FIG. 12, the cellphone includes a radio frequency (RF) circuit 1210, a memory 1220, an input unit 1230, a wireless fidelity (WiFi) module 1270, a display unit 1240, a sensor 1250, an audio circuit 1260, a processor 1280 and a power source 1290.

Those skilled in the art may understand that the cellphone structure shown in FIG. 12 does not limit the cellphone, may include more or less parts, or combine some parts, or arrange different parts.

Each constitution part of the cellphone in FIG. 12 is specifically described.

The RF circuit 1210 may be configured to receive and transmit a signal in a message transceiving or calling process, particularly to receive a downlink message of a base station and give to the processor 1280 for processing, and in addition, transmit a design uplink data to the base station. Usually, the RF circuit includes but is not limited to an antenna, at least one amplifier, a message transceiving machine, a coupler, a low noise amplifier (LNA), a duplexer and the like. In addition, the RF circuit may be further configured to communicate with a network or other devices by wireless communication. The wireless communication may use any communication standard or protocol, and includes but is not limited to a global system of mobile communication (GSM), a general packet radio service (GPRS), a code division multiple access (CDMA), a wideband code division multiple access (WCDMA), a long term evolution (LTE), an email, a short messaging service (SMS) and the like.

The memory 1220 may be configured to store a software program or module, and by operating the software program or module stored in the memory 1220, the processor 1280 executes various functions of the cellphone and processes data. The memory 1220 may mainly include a storage program area and a storage data area, wherein the storage program area may store an operation system, and an application program (such as a voice playing function, an image playing function and the like) required by at least one function; the storage data area may store data (for example, audio data, a phone book and the like) created according to use of the cellphone. In addition, the memory 1220 may include a high speed random access memory, and may further include a nonvolatile memory for example, at least one disk memory device, a flash device, or other volatile solid memory devices.

The input unit 1230 may be configured to receive input number or character information and generate key signal input related to user setting and function control of the cellphone 510. Specifically, the input unit 1230 may include a touch panel 1231 and other input devices 1232 called as a touch screen, may collect a touch operation of the user on or close to the touch screen (for example, the operation of the user on or in vicinity of the touch panel 1231 using fingers, a touch pen or any suitable articles), and drive a corresponding connecting apparatus according to a preset form. Optionally, the touch panel 1231 may include a touch detection device and a touch controller, wherein the touch detection device detects a touch direction of the user, detects a signal brought by the touch operation and transmits the signal to the touch controller; the touch controller receives touch information from the touch detection device, coverts to touch point coordinates, transmits to the processor 1280, and receives a command transmitted from the processor 1280 for execution. In addition, the touch panel 1231 may be realized by adopting a resistor type, a capacitor type, infrared rays and surface sound waves. Except the touch panel 1231, the input unit 1230 may further include other input devices 1231. Specifically, the other input devices 1232 may include but are not limited to one or more of a physical keyboard, functional keys (such as a volume control key and a switch key), a trackball, a mouse and an operation rod.

The display unit 1240 may be configured to display information input by the user or provided for the user or various menus of the cellphone. The display unit 1240 includes a display panel 1241, and optionally, a liquid crystal display (LCD), an organic light-emitting diode (OLED) and other types may be selected to configure the display panel 1241. Further, the touch panel 1230 may cover the display panel 1241, after the touch panel 1231 detects the touch operation on or in vicinity of the touch panel, the touch operation is transmitted to the processor 1280 to determine the type of a touch event, and then the processor 1280 provides corresponding visual output on the display panel 1241 according to the type of the touch event. Although in FIG. 12, the touch panel 1231 and the display panel 1241 realize input and output functions of the cellphone as two independent parts, in some embodiments, the touch panel 1231 and the display panel 1241 may be integrated to realize the input and output functions of the cellphone.

The cellphone 510 may include at least one sensor 1250, for example, a light sensor, a motion sensor and other sensors. Specifically, the light sensor may include an environment light sensor and a proximity sensor, wherein the environment light sensor may adjust the brightness of the display panel 1241 according to brightness of light, and the proximity sensor turns off the display panel and/or backlight when the cellphone is moved to an ear. As one of motion sensors, an accelerator sensor may detect the size of an acceleration in each direction (three axes generally), may detect the size and direction of gravity when being static, may be configured to recognize application of cellphone gestures (for example, horizontal and vertical screen switching, related games and magnetometer gesture correcting) and vibrate to recognize related functions (for example, a step counter and knocking); and other configurable sensors such as a gyroscope, a barometer, a hygrometer, a thermometer and an infrared sensor of the cellphone are not repeated herein.

The audio circuit 1260, a loudspeaker 1261 and a microphone 1262 may provide an audio interface between the user and the cellphone. The audio circuit 1260 may transmits an electric signal converted by received audio data to the loudspeaker 1261, and the loudspeaker 1261 converts to voice for outputting; the microphone 1262 coverts a collected voice signal to an electric signal, which is received by the audio circuit 1260 and converted to audio data, then the audio data is output to the processor 1280 for processing, and is transmitted to for example, another cellphone through the RF circuit 1210, or the audio data is output to the memory 1220 for further processing.

WiFi belongs to a short distance wireless transmission technology, the cellphone may help the user to receive and send an email, browse a webpage and access a streaming media by the WiFi module 1270 and provides wireless wideband internet access for the user. Although FIG. 12 illustrates the WiFi module 1270, it should be understood that the WiFi module is not a necessary constitution part of the cellphone 510 and may be totally omitted in a range of not changing essence of the present disclosure.

The processor 1280 is a control center of the cellphone, connects respective parts of the whole cellphone by using various interfaces and lines, and executes various functions and processes data by operating or executing the software program and/or module stored in the memory 1220 as well as calling data stored in the memory 1220, thus monitoring the overall cellphone. Optionally, the processor 1280 may include one or more processing units; preferably, the processor 1280 can be integrated with an application processor and a modulation and demodulation processor, wherein the application processor is mainly configured to process an operation system, a user interface and an application program, and the modulation and demodulation processor is mainly configured to processing wireless communication. It is understandable that the modulation and demodulation processor may also not integrated into the processor 1280.

The cellophane 510 may further include a power source 1290 (a battery) for powering respective parts, preferably, the power source may be logically connected with the processor 1280 by a power source managing system, so as to realize the function of managing charging, discharging and power consumption functions by the power source managing system. Although not shown, the cellphone 510 may further include a camera, a Bluetooth module and the like which are not repeated.

The user terminal 1200 comprises the processor 1280, having following functions: obtaining a webpage source code from a site server; obtaining a plurality of pictures from a storage server based on an embedded picture access address in the webpage source code, the pictures being captured by the screenshot server based on a preset screenshot strategy from a video from a video server; and broadcasting the pictures.

In some embodiments of the present application, the storage server or the screenshot server may transmit an access address corresponding to the pictures to a site server such that the site server embeds the access address into a webpage source code transmitted to the first user terminal.

In some embodiments of the present application, the preset screenshot strategy may be to capture a plurality of pictures from the video according to a certain capturing frequency, or capture a plurality of pictures from the video according to multiple set capturing time points, and of course the preset screenshot strategy can be specifically set according to actual scene demands.

In some embodiments of the present application, the screenshot server may generate a timestamp corresponding to each picture in the pictures and store the timestamp corresponding to each picture into the storage server such that after the user terminal 1200 obtains the pictures and the timestamp corresponding to each picture in the pictures from the storage server, playing the pictures based on a time sequence indicated by the timestamp corresponding to each picture, wherein the timestamp corresponding to each picture is used for indicating a time position of the picture in the video.

In some embodiments of the present application, the processor 1280 may further obtain the timestamp corresponding to each picture in the pictures, wherein the timestamp corresponds to each picture is used for indicating a time position of the picture in the video. The broadcasting, by the processor 1280, the pictures includes: playing, by the processor 1280, the pictures based on a time sequence indicated by the timestamp corresponding to each picture. It is understandable that the processor 1280 broadcasts the pictures based on a time sequence indicated by the timestamp corresponding to each picture, thus being favorable to show a video recovery effect to certain degree.

In some embodiments of the present application, the screenshot server may generate a playing serial number corresponding to each picture in the pictures, and stores the playing serial number corresponding to each picture into the storage server such that after the first user terminal obtains the pictures and the playing serial number corresponding to each picture in the pictures from the storage server, playing the pictures based on a playing sequence indicated by the playing serial number corresponding to each picture, wherein the playing serial number corresponding to each picture is matched with a position of the picture in the video.

In some embodiments of the present application, the processor 1280 may further obtain the playing serial number corresponding to each picture in the pictures, wherein the playing serial number corresponding to each picture is matched with a position of the picture in the video. The broadcasting, by the first user terminal, the pictures includes: playing, by the first user terminal, the pictures based on a playing sequence indicated by the timestamp corresponding to each picture. It is understandable that the processor 1280 broadcasts the pictures based on a playing sequence indicated by the playing serial number corresponding to each picture, thus being favorable to show a video recovery effect to certain degree.

Known from above, a technical solution of the some embodiment of the present application introduces a screenshot server, which obtains a video from a video server; captures a plurality of pictures from the video based on a preset screenshot strategy; and stores the pictures into a storage server, and the user terminal 1200 obtains a webpage source code from the site server, and the user terminal 1200 obtains the pictures from the storage server based on the picture access address bedded in the webpage source code. Since the screenshot server obtains the video from the video server, captures a plurality of pictures from the video and stores into the storage server, so that the user terminal may obtain the pictures from the storage server to play, the user terminal may show a video content to certain degree by playing the pictures captured from the video, since the pictures are smaller than the video in data size, with respect to the existing technical technology that the user terminal obtains a played video, the user obtains the pictures captured from the video for playing, and a lag phenomenon is favorably avoided as much as possible. Further, since the screenshot server is employed to directly obtain the video from the video server for screenshot, the user terminal of a video source is not required for screenshot and uploading, and it is favorable to reduce a handling capacity of the user terminal of the video source, and reduce occupation of the video source on a bandwidth of the user terminal.

An embodiment of the present application further provides a computer storage medium, wherein the computer storage medium may store a program, and the program is executed in a manner of including a part of all steps of the video processing method recorded in the method embodiments.

An embodiment of the present application further provides another computer storage medium, wherein the computer storage medium may store a program, and the program is executed in a manner of including a part of all steps of the video channel managing method recorded in the method embodiments.

It should be noted that for the purpose of simple description, abovementioned respective embodiments are described as combination of a series of actions, but the skilled in the art should know that the present application is not limited to described action sequences since according to the present application, some steps may be performed in other sequences or at the same time. Secondly, the skilled in the art should know that the embodiments in the description are preferable embodiments, and involved actions and modules are not necessary for the present application.

In above embodiments, each embodiment is described with different extra emphasis, and a part not described in detail in one certain embodiment may refer to related description in other embodiments.

In the embodiments provided in the present disclosure, it should be understood that the disclosed apparatus may be realized in other manners. For example, abovementioned apparatus embodiments are merely exemplary, for example, the division of the units is only division of logic functions and other division manners may be adopted during actual implementation, for example, a plurality of units or components may be combined or integrated to another system, or some characteristics may be omitted and not executed. The displayed or discussed coupling or direct coupling or communication connection may be indirect coupling or communication connection by some interfaces, apparatuses or units, and may be in electrical or other types.

The units described as separated parts may be physically separated or not, the parts as display units may be physical units or not, and may be positioned in one position or distributed to a plurality of network units. A part of all units therein may be selected to realize the aim of the present embodiment according to actual demands.

In addition, respective functional units in each embodiment may be integrated in one processing unit, and may independently exist, or two or more than two units may be integrated in one unit. Above integrated units may be realized by adopting a hardware manner or realized in a manner of software functional unit.

If realized in the manner of the software functional unit and are sold or used as independent products, the integrated units may be stored in one computer readable storage medium. Based on such understanding, the technical solutions of the present application essentially or a part contributing to the existing technology or all or part of the technical solutions may be embodied in a manner of a software product, the computer software product is stored in a storage medium and comprises a plurality of commands to enable a computer device (a personal computer, server or network) to execute all or a part of steps of the method of each embodiment of the present application. The abovementioned storage medium includes a U disk, a read-only medium (ROM), a random access memory (RAM), a mobile hard disk, a diskette, a compact disk or other mediums capable of storing a program code.

Above embodiments are merely intended to describe the technical solutions of the present application instead of limiting the same; although the present disclosure is described in detail referring to the embodiments, those skilled in the art should understand that they can still perform modifications on the technical solutions recorded in the respective embodiments or perform equivalent substations on part of technical characteristics; and these modifications or substations do not enable the corresponding technical solutions to separate from the spirit and range of the technical solutions of the respective embodiments of the present application.

What is claimed is:

1. A video processing method, comprising:
   obtaining, by a screenshot server, a video from a video server, wherein the video is a live broadcasting video uploaded into the video server by a second user terminal;
   capturing, by the screenshot server, a plurality of pictures from the video based on a preset screenshot strategy, wherein the preset screenshot strategy is to capture the plurality of pictures from the video according to multiple set capturing time points; and
   storing, by the screenshot server, the pictures into a storage server, wherein a link to the pictures is simultaneously displayed in a webpage on a first user terminal, wherein the first user terminal is a mobile terminal, such that the first user terminal obtains the pictures from the storage server in response to a user selection of the link to the pictures and plays the pictures on the first user terminal one by one in a video-like format.

2. The method according to claim 1, further comprising:
   generating, by the screenshot server, a timestamp corresponding to each picture in the pictures;
   storing, by the screenshot server, the timestamp corresponding to each picture into the storage server such that, after the first user terminal obtains the pictures and the timestamp corresponding to each picture in the pictures from the storage server, the first user terminal plays the pictures based on a time sequence indicated by the timestamp corresponding to each picture, the timestamp corresponding to each picture indicating a time position of the picture in the video.

3. The method according to claim 1, further comprising:
   generating, by the screenshot server, a playing serial number corresponding to each picture in the pictures;
   storing, by the screenshot server, the playing serial number corresponding to each picture into the storage server such that, after the first user terminal obtains the pictures and the playing serial number corresponding to each picture in the pictures from the storage server, the first user terminal plays the pictures based on a playing sequence indicated by the playing serial number corresponding to each picture, the playing serial number corresponding to each picture being matched with a position of the picture in the video.

4. The method according to claim 1, wherein the operation of obtaining, by a screenshot server, a video from a video server includes: obtaining, by the screenshot server, a live broadcasting video uploaded into the video server by a second user terminal.

5. The method according to claim 1, further comprising:
   transmitting, by the storage server, an access address corresponding to the pictures to a site server such that the site server embeds the access address into a webpage source code transmitted to the first user terminal.

6. The method according to claim 1, wherein the preset screenshot strategy is to capture a plurality of pictures from the video according to a certain capturing frequency.

7. A video processing method performed by a first user terminal having one or more processors and memory, wherein the first user terminal is a mobile terminal and the method comprising:
   obtaining, by the first user terminal, a webpage source code from a site server;
   obtaining, by the first user terminal, a plurality of pictures from a storage server based on a user selection of an embedded picture access address in the webpage source code, the pictures being captured by a screenshot server from a video from a video server based on a preset screenshot strategy, wherein the preset screenshot strategy is to capture the plurality of pictures from the video according to multiple set capturing time points, each picture having associated playing order information, wherein the video is a live broadcasting video uploaded into the video server by a second user terminal; and
   broadcasting, by the first user terminal, the pictures according to their associated playing order information one by one in a video-like format.

8. The method according to claim 7, further comprising:
   obtaining, by the first user terminal, a timestamp corresponding to each picture in the pictures from the storage server as the corresponding playing order information, the timestamp corresponding to each picture indicating a time position of the picture in the video.

9. The method according to claim 8, further comprising:
broadcasting, by the first user terminal, the pictures based on a time sequence indicated by the timestamp corresponding to each picture.

10. The method according to claim 7, further comprising:
obtaining, by the first user terminal, a playing serial number corresponding to each picture in the pictures from the storage server as the corresponding playing order information, the playing serial number corresponding to each picture being matched with a position of the picture in the video.

11. The method according to claim 10, further comprising:
broadcasting, by the first user terminal, the pictures based on a playing sequence indicated by the playing serial number corresponding to each picture.

12. A screenshot server having one or more processors, memory and one or more program units stored in the memory and to be executed by the one or more processors, the one or more program units comprising:
a video obtaining unit, configured to obtain a video from a video server, wherein the video is a live broadcasting video uploaded into the video server by a second user terminal;
a capturing unit, configured to capture a plurality of pictures from the video based on a preset screenshot strategy, wherein the preset screenshot strategy is to capture the plurality of pictures from the video according to multiple set capturing time points; and
a storage unit, configured to store the pictures into the storage server such that a first user terminal, wherein the first user terminal is a mobile terminal, obtains the pictures from the storage server in response to a user selection of a link to the pictures displayed in a webpage on the first user terminal and plays the pictures on the first user terminal one by one in a video-like format.

13. The screenshot server according to claim 12, further comprising:
a timestamp unit, configured to generate a timestamp corresponding each picture in the pictures; and
the storage unit is further configured to store the timestamp corresponding to each picture into the storage server such that, after the first user terminal obtains the pictures and the timestamp corresponding to each picture in the pictures from the storage server, the first user terminal plays the pictures based on a time sequence indicated by the timestamp corresponding to each picture, the timestamp corresponding to each picture being used for indicating a time position of the picture in the video.

14. The screenshot server according to claim 12, further comprising:
a serial number unit, configured to generate a playing serial number corresponding to each picture in the pictures; and
the storage unit is further configured to store the playing serial number corresponding to each picture into the storage server such that, after the first user terminal obtains the pictures and the playing serial number corresponding to each picture in the pictures from the storage server, the first user terminal plays the pictures based on a playing sequence indicated by the playing serial number corresponding to each picture, the playing serial number corresponding to each picture being matched with a position of the picture in the video.

15. The screenshot server according to claim 12, wherein the video obtaining unit is specifically configured to obtain a live broadcasting video uploaded into the video server by a second user terminal.

16. The screenshot server according to claim 12, further comprising:
an address unit, configured to transmit an access address corresponding to the pictures to a site server such that the site server embeds the access address into a webpage source code transmitted by the first user terminal.

17. The screenshot server according to claim 12, wherein the preset screenshot strategy is to capture a plurality of pictures from the video according to a certain capturing frequency.

* * * * *